(12) United States Patent
Ogawa

(10) Patent No.: US 12,389,103 B2
(45) Date of Patent: Aug. 12, 2025

(54) ELECTRONIC DEVICE FOR PROMPTING A USER TO SELECT SETTINGS ACCORDING TO THE ORIENTATION OF THE ELECTRONIC DEVICE

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 18/334,993

(22) Filed: Jun. 14, 2023

(65) Prior Publication Data

US 2023/0328354 A1 Oct. 12, 2023

Related U.S. Application Data

(63) Continuation of application No. PCT/JP2021/046055, filed on Dec. 14, 2021.

(30) Foreign Application Priority Data

Dec. 17, 2020 (JP) .................................. 2020-209579

(51) Int. Cl.
*H04N 5/335* (2011.01)
*G03B 17/20* (2021.01)
(Continued)

(52) U.S. Cl.
CPC ............. *H04N 23/60* (2023.01); *G03B 17/20* (2013.01); *G06F 3/0484* (2013.01); *G02B 17/02* (2013.01)

(58) Field of Classification Search
CPC ....................................................... G03B 17/20
See application file for complete search history.

(56) References Cited

U.S. PATENT DOCUMENTS 5,471,542 A * 11/1995 Ragland ................. G06V 40/19
382/128
11,837,022 B2 * 12/2023 Mori ....................... G06F 3/013
(Continued)

FOREIGN PATENT DOCUMENTS

| JP | H05333259 A | 12/1993 |
|---|---|---|
| JP | H07255676 A | 10/1995 |

(Continued)

*Primary Examiner* — Gary C Vieaux
(74) *Attorney, Agent, or Firm* — Canon U.S.A., Inc. IP Division

(57) ABSTRACT

An electronic device includes setting means configured to set a predetermined function related to control of the electronic device and capable of being performed regardless of an orientation of the electronic device, orientation detection means configured to detect the orientation of the electronic device, and control means configured to perform control such that in a case where the orientation detection means detects that the electronic device is in a first orientation, a first display is given on display means to prompt to set the predetermined function depending on a setting state of the predetermined function wherein the first display includes a display item for instructing to set the predetermined function by a user operation, and in a case where the orientation detection means detects that the electronic device is in a second orientation different from the first orientation, the first display is not given.

18 Claims, 16 Drawing Sheets

(51) Int. Cl.
*G06F 3/0484* (2022.01)
*H04N 23/60* (2023.01)
*G02B 17/02* (2006.01)

(56) References Cited

U.S. PATENT DOCUMENTS

2019/0011983 A1* 1/2019 Yasuda ............... G06F 3/04842
2021/0357027 A1* 11/2021 Yamasaki ............... H04N 23/60
2024/0062583 A1* 2/2024 Mori ....................... G06F 3/013

FOREIGN PATENT DOCUMENTS

| JP | 2006333238 A | 12/2006 |
| JP | 2016063249 A | 4/2016 |
| JP | 2017215532 A | 12/2017 |

* cited by examiner

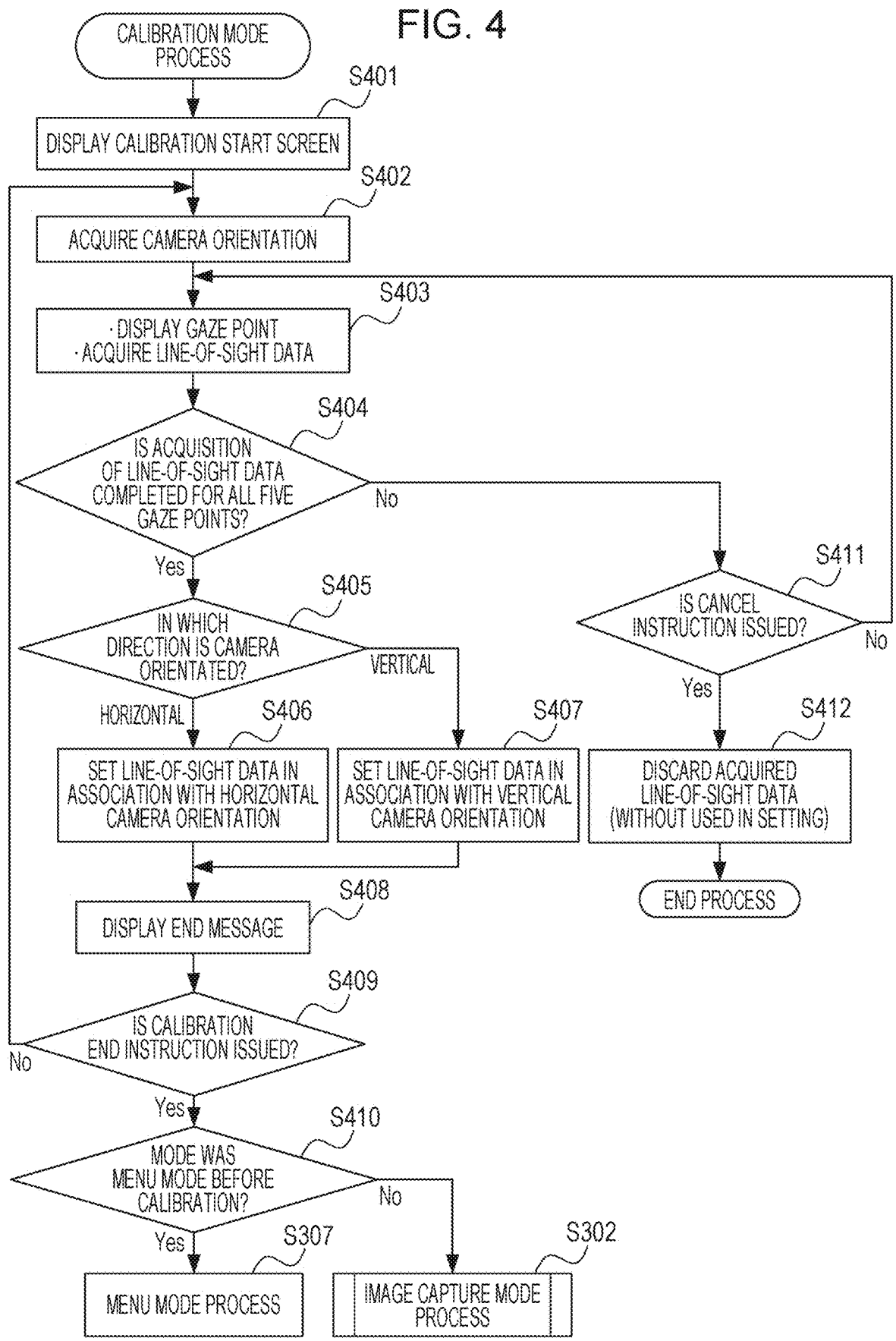

ELECTRONIC DEVICE FOR PROMPTING A USER TO SELECT SETTINGS ACCORDING TO THE ORIENTATION OF THE ELECTRONIC DEVICE

CROSS-REFERENCE TO RELATED APPLICATIONS

This application is a Continuation of International Patent Application No. PCT/JP2021/046055, filed Dec. 14, 2021, which claims the benefit of Japanese Patent Application No. 2020-209579, filed Dec. 17, 2020, both of which are hereby incorporated by reference herein in their entirety.

TECHNICAL FIELD

The present invention relates to an electronic device that can be used in various orientations of its housing and that can control the display according to the orientation and settings of the electronic device, a control method therefor, a program, and a storage medium.

BACKGROUND ART

There is known a digital camera configured to detect the line of sight of a user using the digital camera to capture an image and to detect a position (an area) in a viewfinder that the user is looking at thereby controlling an imaging function such as automatic focus adjustment. PTL 1 discloses that when calibration data is set so as to match the user's eyeball rotation angle with the gaze point based on the direction of the user's line of sight, the setting is made such that the calibration data is associated with the posture (the orientation) of an optical device.

CITATION LIST

Patent Literature

PTL 1: Japanese Patent Laid-Open No. 07-255676

However, in the technique disclosed in PTL 1, when the user's line-of-sight input is used in the digital camera, the user cannot recognize the fact that if calibration data is not set, a discrepancy occurs between the position at which the user is looking and the detected line-of-sight position (which causes a reduction in the line-of-sight detection accuracy). Even when a display is given to prompt the user to make settings, there is a possibility that the display annoys the user depending on the orientation of the digital camera. A user may not recognize that regardless of whether the line-of-sight input is used in the digital camera, or regardless of whether an operation of capturing an image is being performed, it may be desirable to perform setting of a function of controlling a device such as a smartphone. Depending on the orientation of the device, a display that prompts the user to perform such a setting may be annoying.

In view of the above, an object of the present invention is to provide, at a proper timing, a display that prompts the user to set the function related to the control of an electronic device.

SUMMARY OF INVENTION

To solve the above problem, the present invention provides an electronic device including setting means configured to set a predetermined function related to control of the electronic device and capable of being performed regardless of an orientation of the electronic device, orientation detection means configured to detect the orientation of the electronic device, and control means configured to perform control such that in a case where the orientation detection means detects that the electronic device is in a first orientation, a first display is given on display means to prompt to set the predetermined function depending on a setting state of the predetermined function wherein the first display includes a display item for instructing to set the predetermined function by a user operation, and in a case where the orientation detection means detects that the electronic device is in a second orientation different from the first orientation, the first display is not given.

Further features of the present invention will become apparent from the following description of exemplary embodiments with reference to the attached drawings.

BRIEF DESCRIPTION OF DRAWINGS

FIG. 4 is a diagram illustrating a flowchart of control processing in a calibration mode process in a digital camera.

DESCRIPTION OF EMBODIMENTS

External View of Digital Camera 100

Embodiments of the present invention are described below with reference to the drawings.

Figure 1A:
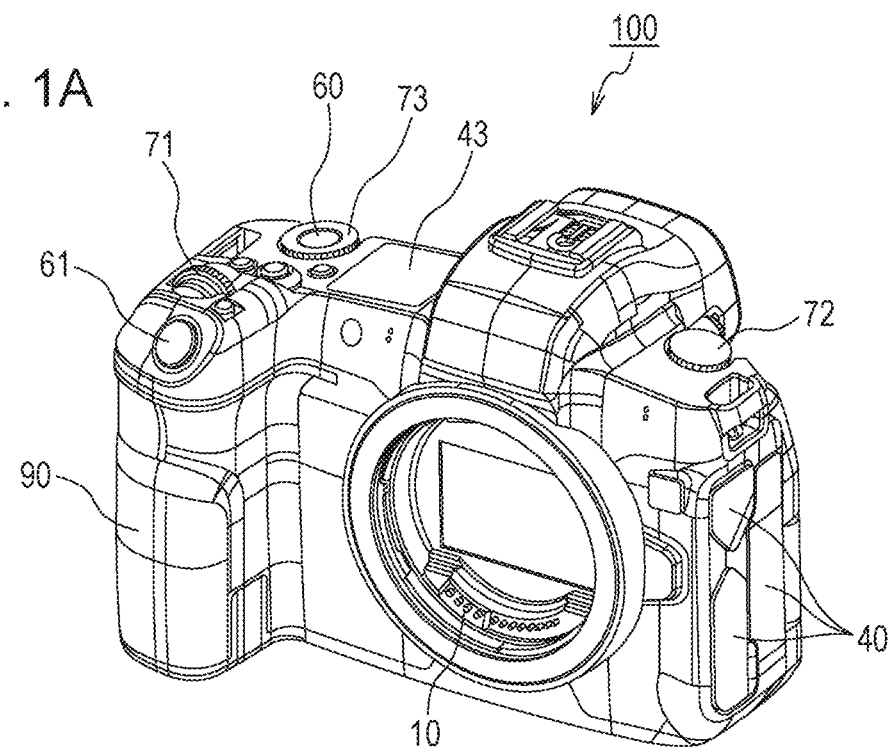
FIG. 1A shows an external view of a camera according to an embodiment.
Figure 1B:
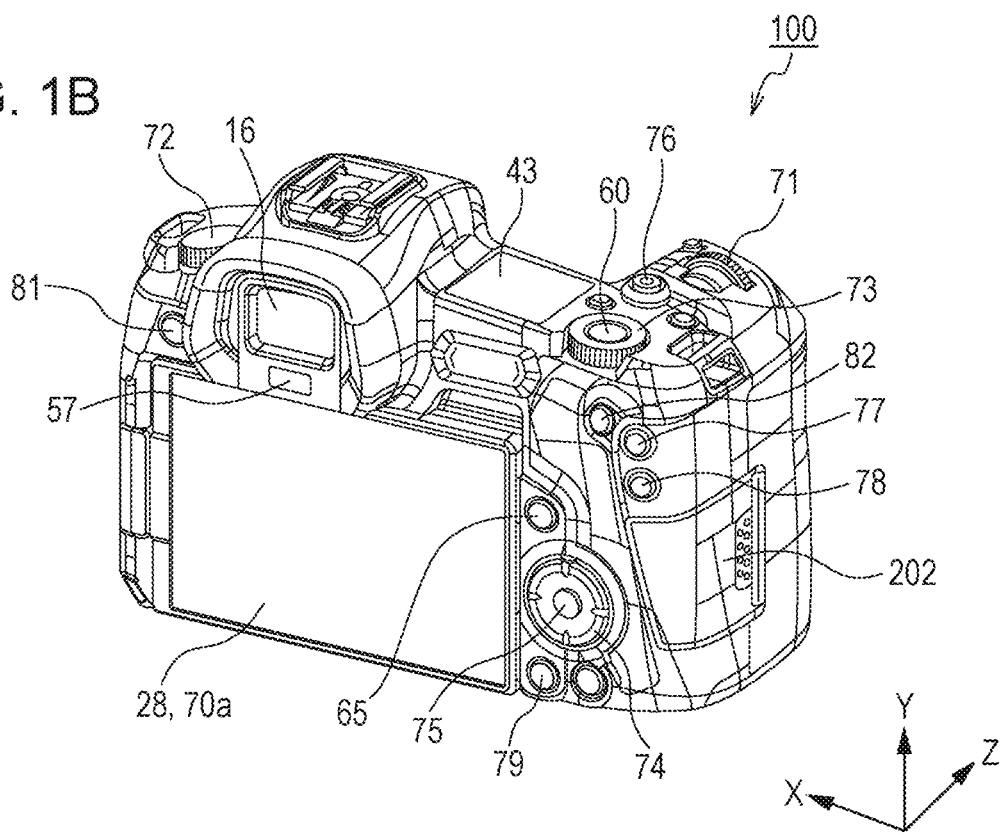
FIG. 1B shows an external view of a camera according to an embodiment.

FIGS. 1A and 1B each show an external view of a digital camera 100, which is an example of an apparatus according to the present invention. FIG. 1A shows an oblique front view of the digital camera 100 and FIG. 1B shows an oblique rear view of the digital camera 100. In FIGS. 1A and 1B, a display unit 28 is a display unit disposed on the back of the camera and configured to display an image and various kinds of information. A touch panel 70a is a touch-operable operation member and can detect a touch operation on a display surface (an operation surface) of the display unit 28. An outside-viewfinder display unit 43 is a display unit located outside the viewfinder of the camera and is configured to display a shutter speed, an aperture value, and various other camera settings.

A shutter button 61 is an operation member for issuing an image capture instruction. The mode selection switch 60 is an operation member for switching between various modes. A terminal cover 40 is a cover that protects a connector (not shown) that connects the digital camera 100 and a connection cable of an external device. A main electronic dial 71 is a rotary operation member included in the operation unit 70. By turning the main electronic dial 71, it is possible to change the shutter speed, the aperture value, and other setting values. A power switch 72 is an operation member for turning on/off a power supply of the digital camera 100. A sub-electronic dial 73 is a rotary operation member included in the operation unit 70 and is capable of moving a selection frame, advancing/reversing an image frame, and/or the like. A cross key 74 is included in the operation unit 70 and is an operation member having a push button that is allowed to be pushed in four directions. Depending on the direction in which the cross key 74 is pushed, a different operation is performed. A set button 75 is a push button included in the operation unit 70 and is mainly used to select a selection item. A movie button 76 is used to start and stop capturing (recording) a moving image. An AF-ON button 77 is included in the operation unit 70 and is used to start an AF operation. The AF operation is mainly started when the shutter button 61 is pressed, but an instruction to start the AF operation is also issued when the AF-ON button is pressed. In a case where the digital camera 100 can be set such that the AF operation is not performed when the shutter button 61 is pressed, the AF start instruction and the image capture instruction can be separated. By pressing the shutter button 61 after pressing an AE lock button 78, it is possible to capture an image while the AF position is locked, and it is also possible to capture an image in a situation where the AF operation is not possible. An AF-ON button 77 is included in the operation unit 70. When the AF-ON button 77 is pressed in an image capture standby state (in which the preparation for capturing an image is not being performed and the start of capturing an image using the imaging unit 22 in the image capture mode is awaited), the exposure condition is locked. That is, it is possible to capture an image using an exposure value locked by a user. A playback button 79 is an operation button included in the operation unit 70 and is used to switch between the image capture mode and the playback mode. When the playback button 79 is pressed in the image capture mode, the operation mode changes to the playback mode in which it is allowed to display on the display unit 28 the latest image among the images recorded in a recording medium 200. When a menu button 81 included in the operation unit 70 is pressed, a menu screen is displayed on the display unit 28 and it becomes possible to make various settings. A multicontroller 65 is an operation member including a directional switch that can be operated in eight directions and a push button that can be pressed. Various operations can be performed depending on the direction in which the multicontroller 65 is tilted. The user can intuitively make various settings on the menu screen displayed on the display 28 using the cross key 74, the set button 75, and the multicontroller 65. A line-of-sight determination button 82 is a push button that is an operation member included in the operation unit 70 and is used to instruct to select a subject or cancel the selection of a subject based on the position of the line-of-sight pointer, which will be described later. The line-of-sight determination button is located at a position that allows the user to easily operate the line-of-sight determination button even when the user is looking into the viewfinder (while the user's eye is in contact with the eyepiece 16) by operating it with the thumb of the right hand holding a grip part 90.

The operation unit 70 is a collection of a variety of operation members serving as input units for accepting operations from the user. The operation unit 70 includes push buttons, rotary dials, touch sensors, etc. The operation unit 70 includes at least the following: the shutter button 61, the touch panel 70a, the main electronic dial 71, the power switch 72, the sub-electronic dial 73, the cross key 74, the set button 75, the movie button 76, the AF-ON button 77, the AE lock button 78, the playback button 79, the menu button 81, the line-of-sight determination button 82, the multicontroller 65, a filter button 84, and a framing assist button. As for the line-of-sight determination function, which will be described below, for moving the AF frame to the position pointed to by the line of sight, a dedicated button therefor may be mounted on the digital camera 100, or the line-of-sight determination function may be assigned to an operation member that also has another function. Examples of the operation members that can be assigned the line-of-sight determination function include the AF-ON button 77, the AE lock button 78, the push button in the multicontroller 65, the filter button 84, and the framing assist button. The AF-ON button 77, the AE lock button 78, and the multicontroller 65 are positioned such that the user can operate them with his/her right index finger while operating the shutter button 61 without interfering with the image capture operation. More specifically, when the user grasps the grip part 90 with the right hand, the operation members described above are located above the center position of the back of the digital camera 100, on the side opposite to the subject (that is, on the side where the shutter button is located), and to the right of the EVF 29 (on the side of the grip part 90). The positions thereof are not limited to the back of the digital camera 100 as long as the user can operate them while operating the shutter button 61. For example, the filter button 84, the framing assist button, or similar operation members may be disposed on the front side (on the side of the subject) or some operation members may be provided on the lens unit 150. In this case, the locations of the operation members are not limited to the back of the digital camera 100 as described above, but the operation members may be disposed at any positions as long as they can be operated by an index finger or other fingers of the right hand with which the user operates the shutter button 61. Examples of the operation members with other functions to which the user can assign the line-of-sight determination function include a button that does not cause a transition from the image capture mode even when it is operated while the shutter button 61 is being operated, a function button that does not interfere with the image capture function performed when the shutter button 61 is operated. The line-of-sight determination function may be assigned to a button that can be pressed and can be assigned various functions. The operation member for the above purpose is not limited to a push button, but an operation bar that can be operated to the left or right, a rotatable operation ring, or the like may be used. Alternatively, a touch panel 70a that detects a pressing force may be configured such that when it is pressed with a strong pressure, the function described above is performed.

A communication terminal 10 is a communication terminal for the digital camera 100 to communicate with the lens unit 150 (removable) described below. The eyepiece 16 is an eyepiece of an eyepiece viewfinder (a view-in viewfinder). The user can view an image displayed on the EVF (Electric View Finder) 29, serving as an in-viewfinder display unit, through the eyepiece 16. The eye contact detection unit 57 is an eye contact detection sensor that detects whether the eye of the user who is capturing an image is in contact with the eyepiece 16. A lid 202 is a lid of a slot in which the recording medium 200 is placed. The grip part 90 is a holding part shaped to be easily grasped with the right hand when the user holds the digital camera 100. The shutter button 61 and the main electronic dial 71 are located at positions that allow it to operate them with the index finger of the right hand while holding the digital camera by gripping the grip part 90 with the little finger, the ring finger, and the middle finger of the right hand. In this state, the sub-electronic dial 73 is located at a position where it can be operated with the thumb of the right hand.

Figure 2:
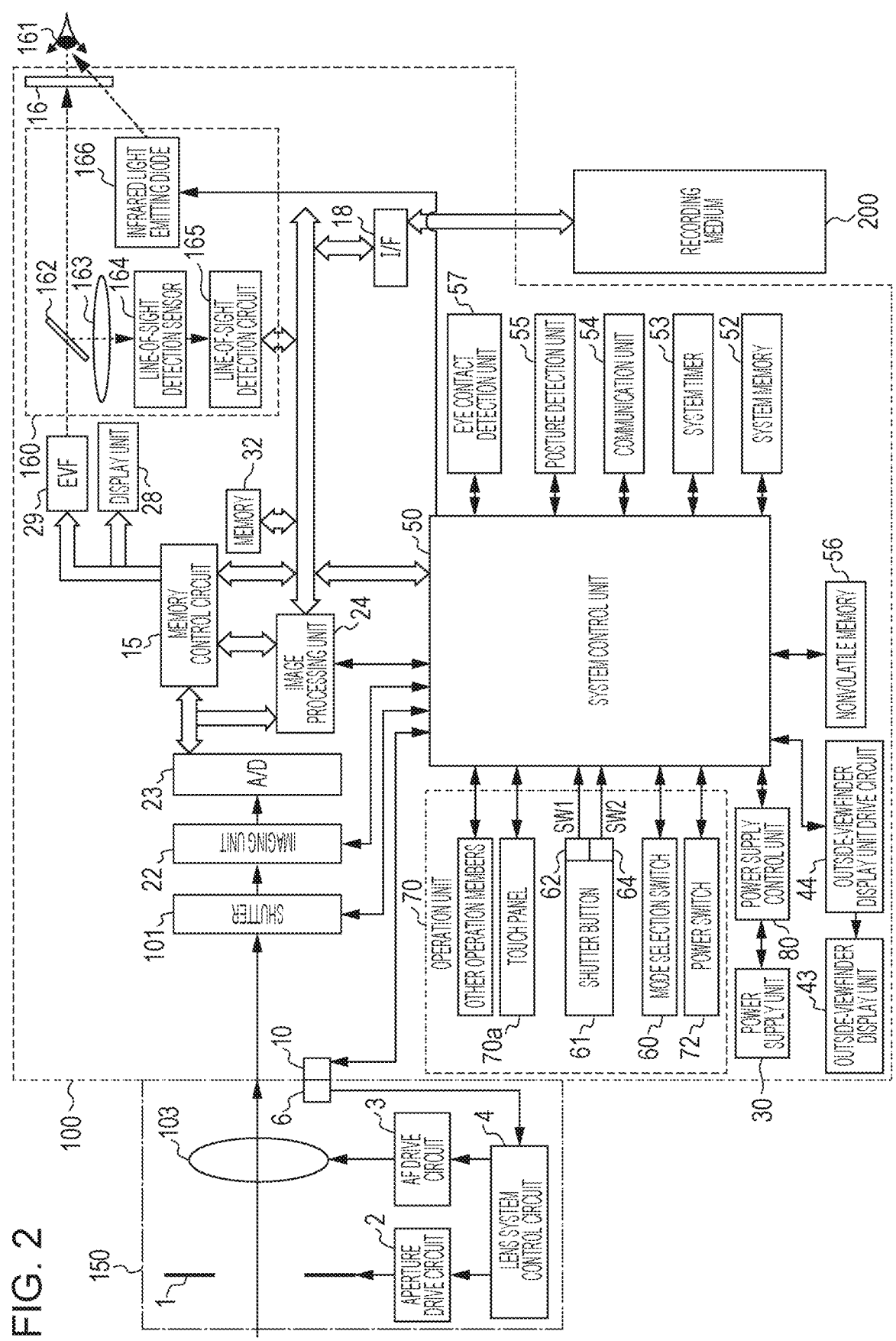
FIG. 2 is a functional block diagram illustrating a configuration according to an embodiment.

FIG. 2 is a block diagram illustrating an example of a configuration of the digital camera 100 according to the present embodiment. In FIG. 2, the lens unit 150 is a lens unit including an interchangeable imaging lens. A lens 103 normally includes a plurality of lenses, but is shown here as including only one lens for simplicity. A communication terminal 6 is a communication terminal for the lens unit 150 to communicate with the digital camera 100. The lens unit 150 communicates with the system control unit 50 via this communication terminal 6 and the communication terminal 10 described above, and an internal lens system control circuit 4 controls an aperture 1 via an aperture drive circuit 2. The lens 103 is then moved via the AF drive circuit 3 to adjust the focus.

The shutter 101 is a focal plane shutter that can freely control the exposure time of the imaging unit 22 under the control of the system control unit 50.

The imaging unit 22 is an imaging device including a CCD device, a CMOS device, or the like configured to convert an optical image into an electrical signal. An A/D converter 23 is used to convert an analog signal output from the imaging unit 22 into a digital signal.

An image processing unit performs a predetermined pixel interpolation process, a resizing process such as a reduction process, a color conversion process, and/or the like on data supplied from the A/D converter 23 or a memory control unit 15 (described below). In addition, the image processing unit 24 performs a predetermined calculation process on captured image data. The system control unit 50 performs exposure control and distance measurement control based on a result of the calculation process performed by the image processing unit 24. More specifically, AF (auto focus) processing, AE (auto exposure) processing, and EF (pre-emission of flash) processing are performed using a TTL (through-the-lens) method. The image processing unit 24 further performs a predetermined calculation process on the captured image data, and performs AWB (auto white balance) processing using the TTL method based on the obtained calculation result.

The memory control unit 15 controls data transfer between the A/D converter 23, the image processing unit 24, and the memory 32. The output data from the A/D converter 23 is written into the memory 32 via the image processing unit 24 and the memory control unit 15, or directly via the memory control unit 15. The memory 32 stores image data acquired by the imaging unit 22 and converted to digital data by the A/D converter 23 and image data for displaying on the display unit 28 and the EVF 29. The memory 32 has a sufficient storage capacity to store a predetermined number of still images or a predetermined length of moving images and sound.

The memory 32 also serves as a memory (a video memory) for displaying an image. The image data for display written to the memory 32 is displayed by the display unit 28 or the EVF 29 via the memory control unit 15. The display unit 28 and the EVF 29 display an image on a display device such as an LCD, or an OLED according to a signal from the memory control unit 15. A live view displaying (LV displaying) can be performed by sequentially transferring data that is A/D-converted by the A/D converter 23 and is stored in the memory 32 to the display unit 28 or the EVF 29 and displaying the data. Hereinafter, the image displayed by the live view processing is referred to as the live view image (LV image).

An infrared light emitting diode 166 is a light emitting element for detecting the user's line of sight on the screen in the viewfinder and emits infrared light to the user's eyeball (eye) 161. Infrared light emitted from the infrared light emitting diode 166 is reflected by the eyeball (eye) 161, and the reflected infrared light reaches a dichroic mirror 162. The dichroic mirror 162 reflects only infrared light and transmits visible light. The reflected infrared light, whose optical path is changed, forms an image on the imaging surface of a line-of-sight detection sensor 164 via the imaging lens 163. The imaging lens 163 is an optical component that constitutes a line-of-sight detection optical system. The line-of-sight detection sensor 164 includes an imaging device such as a CCD-type image sensor.

The line-of-sight detection sensor 164 photoelectrically converts incident reflected infrared light into an electrical signal and outputs the resultant electric signal to a line-of-sight detection circuit 165. The line-of-sight detection circuit 165 includes at least one processor and is configured to detect a user's line of sight from the image or movement of the user's eyeball (eye) 161 based on the output signal from the line-of-sight detection sensor 164 and to output detection information to the system control unit 50. Thus, the dichroic mirror 162, the imaging lens 163, the line-of-sight detection sensor 164, the infrared light emitting diode 166, and the line-of-sight detection circuit 165 form a line-of-sight detection block 160. The line-of-sight detection block 160 is one of accept means that accepts a line-of-sight input.

In the present invention, the line of sight is detected by the line-of-sight detection block 160 using a corneal reflection method. In the corneal reflection method, a movement of the user's eye is detected based on a positional relationship between reflected infrared light emitted from the infrared light emitting diode 166 and the pupil of the eyeball (eye) 161 and more particularly between the reflected light on the cornea and the pupil of the eyeball (eye) 161, and the direction of the user's eye (line of sight) is detected. There are various other methods for detecting the line of sight, such as a method called the scleral reflection method, which uses the difference in reflectance of light between the black and white of the eye. Other line-of-sight detection methods may be used as long as they can detect the line of sight.

The various camera settings, including the shutter speed and the aperture value, are displayed on the outside-viewfinder display unit 43 via the outside-viewfinder display unit drive circuit 44.

A nonvolatile memory 56 is an electrically erasable and rewritable memory, such as a flash ROM. The nonvolatile memory 56 stores constants, programs, etc., for operation of the system control unit 50. The program refers to a program for executing various flowcharts described below according to the present embodiment.

The system control unit 50 includes at least one processor or a circuit and controls the entire digital camera 100. By executing the program stored in the nonvolatile memory 56 described above, each of the processes according to the present embodiment described below is realized. For example, a RAM is used as the system memory 52, and constants, variables, and the programs for operation of the system control unit 50 are read from the nonvolatile memory 56 and loaded into the system memory 52. The system control unit 50 also performs display control by controlling the memory 32, the display unit 28, etc.

A system timer 53 is a time measurement unit that measures the time in various controls and measures the time of a built-in clock.

The mode selection switch 60 is an operation member included in the operation unit 70 and switches the operation mode of the system control unit 50 between a still image capture mode, a moving image capture mode, etc. The modes included in the still image capture mode are an automatic image capture mode, an automatic scene determination mode, a manual mode, an aperture priority mode (Av mode), a shutter speed priority mode (Tv mode), and a program AE mode (P mode). There are also various scene modes and custom modes, which are available in the image capture settings for various scenes. The mode selection switch 60 allows the user to switch directly to one of these modes. Alternatively, after switching once to a screen of a list of image capture modes using the mode selection switch 60, the user may select one of a plurality of modes displayed and may switch to the selected mode using another operation member. Similarly, the moving image capture mode may include a plurality of modes.

A first shutter switch 62 is turned on in the middle of the operation of the shutter button 61 provided on the digital camera 100, that is, the first shutter switch 62 is turned on when the shutter button 61 is half-pressed (to issue an instruction to prepare to capture an image). When the first shutter switch 62 is turned on, a first shutter switch signal SW1 is generated. The first shutter switch signal SW1 causes starting of an image capture preparation operation such as AF (auto focus) processing, AE (auto exposure) processing, AWB (auto white balance) processing, and EF (flash pre-emission) processing.

A second shutter switch 64 is turned on when the shutter button 61 is fully pressed to a so-called fully pressed position (to issue an image capture instruction), and a second shutter switch signal SW2 is generated. In response to the second shutter switch signal SW2, the system control unit 50 starts a series of image capture processes from reading a signal from the imaging unit 22 to writing the captured image as an image file to the recording medium 200. When the second shutter switch is kept on, the digital camera 100 performs a continuous image capture operation (continuous capturing) at a speed that depends on the predetermined allowable continuous image capture speed.

A power supply control unit 80 includes a battery detection circuit, a DC-DC converter, a switching circuit that switches the block to be supplied with power, and the like, and detects whether a battery is installed, the type of the battery, and the remaining battery power. The power supply control unit 80 controls the DC-DC converter based on the detection result and an instruction from the system control unit 50, and supplies the required voltage to various parts including the recording medium 200 for the required period of time. A power supply unit 30 includes a primary battery such as an alkaline or lithium battery, a secondary battery such as a NiCd, NiMH, or Li battery, and an AC adapter.

A recording medium I/F 18 is an interface with the recording medium 200 such as a memory card, a hard disk or the like. The recording medium 200 is a recording medium such as a memory card or the like for recording a captured image, and the recording medium 200 may be implemented, for example, by a semiconductor memory, a magnetic disk, or the like.

A communication unit 54 transmits/receives a video signal and/or an audio signal via a wireless or wired cable connection. The communication unit 54 can also be connected to a wireless LAN (Local Area Network) and the Internet. The communication unit 54 can also communicate with an external device via Bluetooth (registered trademark) or Bluetooth Low Energy. The communication unit 54 can transmit an image (including a live view image) captured by the imaging unit 22, and an image recorded in the recording medium 200, and can receive an image and various information from an external device.

A posture detection unit 55 detects the posture (orientation) of the digital camera 100 relative to the direction of gravity. Based on the posture detected by the posture detection unit 55, it is possible to determine whether the image captured by the imaging unit 22 is an image captured by the digital camera 100 held horizontally or vertically. The system control unit 50 can add orientation information corresponding to the posture detected by the posture detection unit 55 to an image file of an image captured by the imaging unit 22, or can rotate the image and record the resultant rotated image. An acceleration sensor, a gyro sensor, or the like may be used as the posture detection unit 55. It is also possible to detect the movement of the digital camera 100 (e.g., pan, tilt, lift, whether it is stationary or not, etc.) by the acceleration sensor or the gyro sensor used as the posture detection part 55.

An eye contact detection unit 57 is an eye contact detection sensor configured to detect the approach (eye contact) and departure (eye separation) of an eye (object) 161 toward/from the eyepiece 16 of the viewfinder. The system control unit 50 switches the display unit 28 and the EVF 29 between the display-on state and the display-off state according to the state detected by the eye contact detection unit 57. More specifically, at least when the digital camera 100 is in the standby mode for capturing an image, and when the switch setting for the display destination of the live view image captured by the imaging unit 22 is in the automatic switching mode, the display unit 28 is specified as the display destination and the display unit 28 is turned on and the EVF 29 is turned off while the eye is not in contact with the eyepiece. When the eye is in contact with the eyepiece, the EVF 29 is set as the display destination device and the EVF 29 is turned on and the display unit 28 is turned off. For example, an infrared proximity sensor may be used as the eye contact detection unit 57 to detect any object approaching the eyepiece 16 of the viewfinder including the EVF 29. When an object approaches, infrared light projected from a projection part (not shown) of the eye contact detection unit 57 is reflected by the object and the reflected infrared light is received by a light reception part (not shown) of the infrared proximity sensor. Based on the amount of infrared light received, it is possible to determine how close the object is to the eyepiece 16 (that is, the eye distance can be detected). As described above, the eye contact detection unit 57 performs the eye contact detection process to detect the distance of the object approaching the eyepiece 16. In the present embodiment, it is assumed that the light projection part and the light reception part of the eye contact detection unit 57 are realized by devices different from the infrared light emitting diode 166 and the line-of-sight detection sensor 164. However, the infrared light emitting diode 166 may also serve as the light projection part of the eye contact detection unit 57. The line-of-sight detection sensor 164 may also server as the light reception part. In the nothing-on-eyepiece state (that is, nothing is approaching the eyepiece), if an object approaching the eyepiece is detected within a predetermined distance range, it is determined that the eyepiece is in the eye contact state. When an object in the eye contact state (eye approaching state) moves away by an amount greater than or equal to a predetermined distance, it is determined that the object has left. The threshold value for detecting the eye contact state and the threshold value for detecting the eye separation state may be different. This may be achieved, for example, by providing hysteresis. It is assumed that after eye contact is detected, the eye contact state is maintained until eye separation is detected. It is also assumed that after eye separation is detected, the eye separation state is maintained until eye contact is detected. The use of the infrared proximity sensor is merely an example, and other sensors may be employed as the eye contact detection unit 57 as long as it is possible to detect an eye or an object approaching the eyepiece.

The system control unit 50 is capable of detecting the following operations or states based on the output from the line-of-sight detection block 160.

The state in which the line-of-sight detection block 160 detects a line of sight of a user whose eye is in contact with the eyepiece 16, that is, there is a line-of-sight input.

The state in which the line-of-sight detection block 160 detects a line of sight of a user whose eye is in contact with the eyepiece 16, and the user is gazing at someplace (described later).

The state in which after the line-of-sight detection block 160 detects a line of sight of a user, the line of sight disappears and is no longer detected, that is, the line-of-sight input is completed.

The state in which the line-of-sight detection block 160 detects no line of sight of a user whose eye is in contact with the eyepiece 16, that is, the input by line of sight is not detected.

The above-described state in which the user is gazing refers to the state in which the position on the EVF 29 (the line-of-sight position) is identified by the line-of-sight detection block 160 based on the detected line of sight, and it is determined that the identified line-of-sight position has not changed beyond a predetermined range of movement in a predetermined time.

The state where the line-of-sight input is completed may occur when the user's eye is removed from the eyepiece 16, or when the user's eyelid is closed while the eye remains in contact with the eyepiece 16 and thus the user's eye 161 cannot be detected.

The calibration is a calibration step in which the user's line of sight is detected using the line-of-sight detection block 160 and the calibration is performed to achieve more accurate determination of the line-of-sight position pointed to by the user's line of sight. Without performing the calibration, the line-of-sight detection block 160 can detect the user's line of sight and determine the line-of-sight position pointed to by the line of sight. However, the overall structure of the human eye including the eyelid, etc., varies from person to person. Therefore, depending on the user, it may be difficult to determine the line-of-sight position pointed to by the line of sight. By performing the calibration, it is possible to acquire line-of-sight data, which is line-of-sight information unique to the user of the digital camera 100. By calculating the calibrated value from the acquired user-specific line-of-sight data, it is possible to more accurately determine the line-of-sight position pointed to by the line of sight given by the user. In a case where the line-of-sight detection is assumed to be performed in various orientations, as in the case of the digital camera 100 according to the present embodiment, there is a possibility that the positional relationship between the EVF 29 of the digital camera 100 and the eye 161 may change, i.e., the relative positional relationship between the line-of-sight detection block 160 and the eye 161 may change. To handle such a situation, it is desirable to perform calibration for both cases in which the digital camera 100 is in the vertical orientation and in the horizontal orientation. By calculating the line-of-sight position using a calibration value given in each orientation, it is possible to minimize the discrepancy between the position viewed by the user and the detected line-of-sight position. In the present embodiment, if the digital camera 100 has already been calibrated (the CAL data has already been acquired) in either horizontal orientation or vertical orientation, it is possible to detect the line of sight with considerably high accuracy using the acquired CAL data (described below), In the calibration, a plurality of gaze points are displayed at different positions, and line-of-sight data is acquired when the user gazes at each gaze point. The line-of-sight data is accumulated, and calibration values are calculated from the plurality of pieces of line-of-sight data. Since the plurality of gaze points are displayed at different positions, the line-of-sight data can be acquired for various angles of the eyeball. By setting the calculated calibration values as calibration (CAL) data, it is possible to perform more accurate line-of-sight input without requiring the user to perform calibration each time the line-of-sight input is used. Note that in the present embodiment, the calibration value calculated from the acquired line-of-sight data and the orientation of the digital camera 100 are associated with each other and stored and set as CAL data.

In the present embodiment, a total of five gaze points are displayed in the calibration mode. The five gaze points are displayed one by one, and when the line-of-sight data at the first gaze point is acquired, the first gaze point is hidden and the second gaze point is displayed, and so on. When all the line-of-sight data is acquired and the calibration values are calculated, the calibration is completed.

The touch panel 70a and the display unit 28 may be configured integrally. For example, the touch panel 70a is disposed on the top of the display surface of the display unit 28 such that the touch panel 70a has a high enough light transmittance so as not to interfere with displaying of the display unit 28. The input coordinates on the touch panel 70a and the display coordinates on the display screen of the display unit 28 are associated with each other. This makes it possible to provide a display object (a graphical user interface) that can be operated as if the user could directly operate the display screen displayed on the display unit 28. The system control unit 50 can detect the operations or states on the touch panel 70a, described below.

A finger or pen that has not touched the touch panel 70a has newly touched the touch panel 70a. This is referred to as the start of touch (hereinafter referred to as touch-down).

The touch panel 70a is being touched with a finger or pen (hereinafter referred to as "touch-on").

A finger or a pen is moved over the touch panel 70a while keeping the finger or the pen touching the touch panel 70a (hereinafter referred to as "touch-move").

A finger or a pen touching the touch panel 70a is released. This is referred to as the end of touch (hereinafter referred to as touch-up).

The state in which nothing is touched on the touch panel 70a (hereinafter referred to as "touch-off").

When touch-down is detected, touch-on is also detected at the same time. After touch-down is detected, touch-on is normally continued to be detected unless touch-up is detected. Touch-move is detected when touch-on is detected. Even when touch-on is detected, if the touch position does not change, touch-move is not detected. After all fingers and pens touching the touch panel are detected to have touched up, touched-off is detected.

These operations/states and the position coordinates of the finger or the pen touching on the touch panel 70a are notified to the system control unit 50 via an internal bus. The system control unit 50 determines what type of operation (touch operation) is performed on the touch panel 70a based on the notified information. For touch-move, the direction of movement of a finger or a pen moving on the touch panel 70a can also be determined for each vertical and horizontal movement component on the touch panel 70a based on changes in position coordinates. If touch-move for a distance longer than or equal to a predetermined distance is detected, it is determined that a slide operation has been performed. A flick is an operation in which a finger is touched on the touch panel, quickly moved a certain distance while keeping the finger touched on the touch panel, and then released. In other words, the flick is a quick finger-flick operation on the touch panel 70a. When a touch-move for a distance longer than or equal to a predetermined distance and at a speed greater than or equal to a predetermined value is detected, and then touch-up is detected, it is determined that a flick has been performed (it is determined that a flick has been performed after a slide operation). A pinch-in is an operation in which a plurality of points (e.g., two points) are touched simultaneously and their touch positions are moved closer together. A pinch-out is an operation in which their touch positions are moved apart. The pinch-out and the pinch-in are collectively referred to as a pinch operation (or simply a pinch). The touch panel 70a may be any of various types of touch panels, such as resistive, capacitive, surface acoustic wave, infrared, electromagnetic induction, image recognition, and optical sensor types. Depending on the type, a touch is detected by contact with the touch panel or by the proximity of a finger or a pen to the touch panel, and either method can be used.

The digital camera 100 may include an audio input unit (not shown) configured to detect an audio input signal via a built-in microphone or an audio input device connected to the audio input unit via an audio input terminal and to send the audio input to the system control unit 50. In this case, the system control unit 50 selects the input audio signal as required, performs an analog-to-digital conversion, level optimization processing, specific frequency component reduction processing, etc. on the input audio signal thereby generating an audio signal.

Figure 6A:
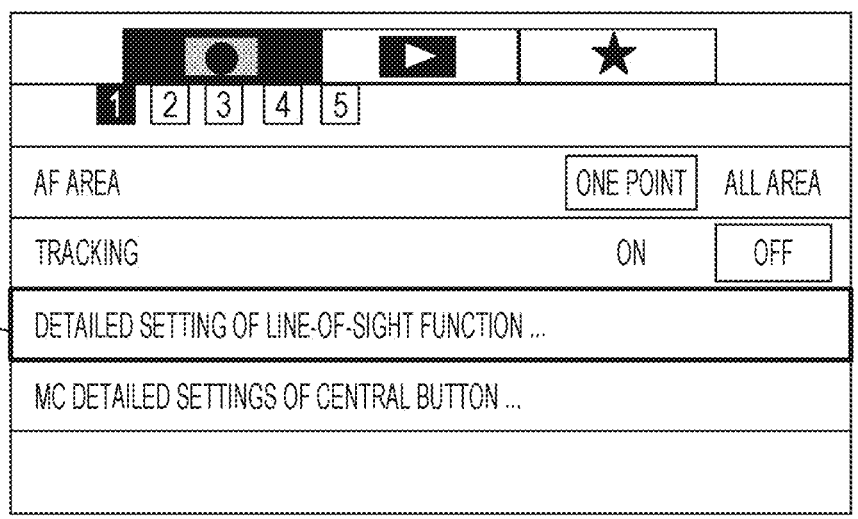
FIG. 6A illustrates a menu screen for setting functions relating to the line of sight according to an embodiment.
Figure 6B:
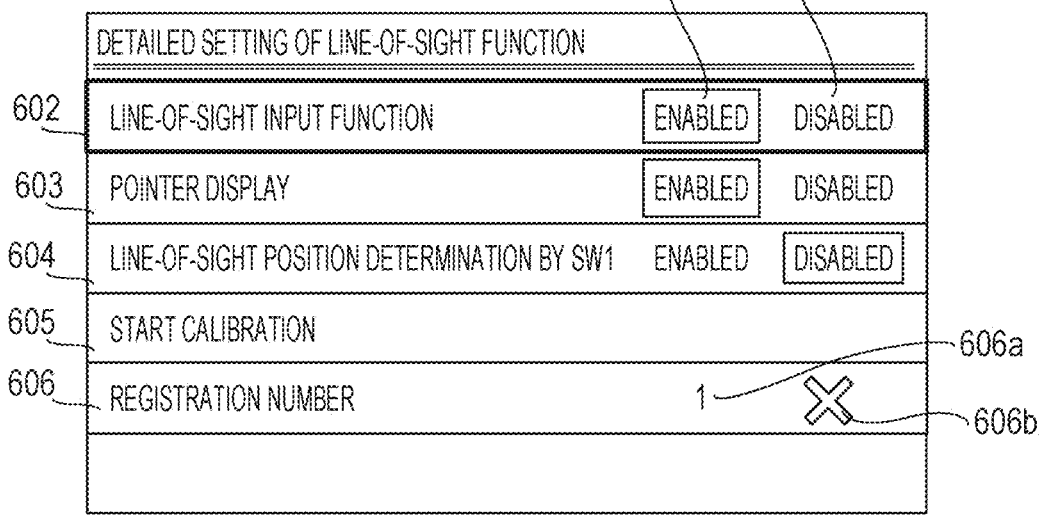
FIG. 6B illustrates a menu screen for setting functions relating to the line of sight according to an embodiment.

FIGS. 6A and 6B each illustrate an example of a displayed setting menu screen regarding a line of sight. When the user selects "Detailed line-of-sight function settings" in a setting item 601 in FIG. 6A, the screen changes to a screen shown in FIG. 6B (which is a screen at a level lower than the level of the setting menu screen shown in FIG. 6A). FIG. 6B illustrates an example of a displayed menu screen for the detailed settings of the line-of-sight function. The menu screen for the detailed settings of the line-of-sight function includes setting items 602 to 606 as selection options (menu items). By switching between "enabled"/"disabled" for the line-of-sight input function in the setting item 602, it is possible to switch whether to detect the user's line of sight, that is, whether to enable the line-of-sight detection block 160. That is, by switching between "enabled"/"disabled" for the line-of-sight input function in the setting item 602, it is set whether or not to accept a line-of-sight input operation by a user using a line of sight.

Figure 8A:
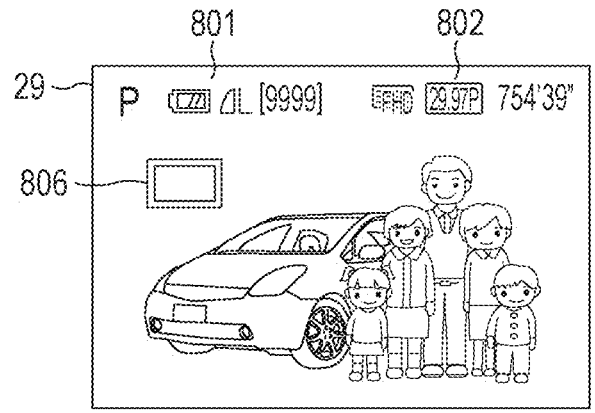
FIG. 8A is a diagram illustrating an example of a display of an orientation of a digital camera 100 and a display of guidance.
Figure 8B:
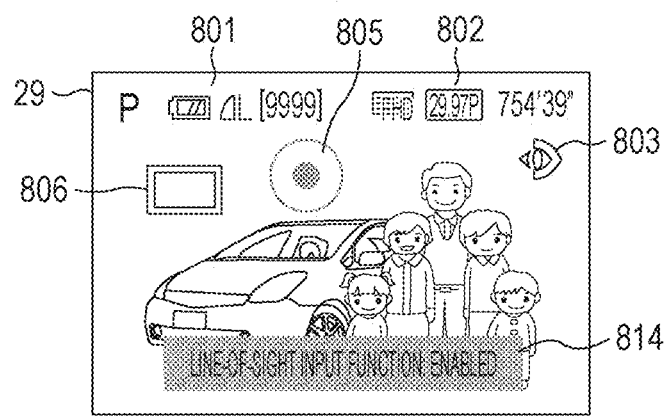
FIG. 8B is a diagram illustrating an example of a display of an orientation of a digital camera 100 and a display of guidance.

The setting item 603 is for setting whether or not to display a line-of-sight pointer at a line-of-sight position. If set to "enabled", the user can visually recognize, by the displayed line-of-sight pointer, the line-of-sight position detected by the line-of-sight detection block 160 according to the direction in which the user's eye is looking. In the present embodiment, the line-of-sight pointer is displayed as an indicator such as a pointer 805 shown in FIG. 8B. A small circle centered on the line-of-sight position is displayed, and a larger circle is displayed around it. In FIG. 8B, the inside of the smaller circle of the pointer 805 is filled, and the frame of the larger circle is filled. Each filled area is semi-transparent such that even if the filled areas overlap the subject or the AF frame of the LV image, the subject is not completely hidden. The area between the small and large circle borders is not filled such that the visibility of the LV image is not affected. When the line-of-sight input function is disabled in the setting item 602, the pointer 805 is not displayed regardless of whether the line-of-sight pointer display is set to be enabled or disabled.

The setting item 604 is for setting whether or not the line-of-sight position is determined (that is, the line-of-sight determination operation is performed) when the first shutter switch (SW1) 62 is turned on, that is, when the shutter button 61 is pressed halfway. When set to "enabled", the line-of-sight position is determined to be at a position detected by the line-of-sight detection block 160 when the shutter button 61 is pressed halfway by the user. When set to "disabled", the line-of-sight position is not determined when the shutter button 61 is pressed halfway.

When the setting item 604 is set to "enabled", the line-of-sight position is not determined when the line-of-sight determination button 82 is pressed, but is determined when the first shutter switch 62 is turned on by pressing the shutter button 61. For example, let us consider a case where when the user half-presses the shutter button 61 after the line-of-sight position is determined by pressing a function button, the line-of-sight position when the shutter button 61 is half-pressed is different from the line-of-sight position determined by the function button. In this case, if the setting item 604 is set to "enabled," there is a possibility that the line-of-sight position is determined at the point of time when the shutter button 61 is half-pressed. That is, there is a possibility that the AF operation is performed on the subject located at the line-of-sight position different from the position specified before the shutter button 61 is half-pressed, which results in poor operability. If the setting item 604 is set to "disabled", such inconvenience can be avoided.

When the user selects the setting item 605, the operation mode switches to the calibration (CAL) mode and the calibration is started to acquire the user's line-of-sight data. The CAL mode process is described below with reference to FIG. 4. Calibration is performed for the calibration registration number specified in the setting item 606. When the calibration is completed, CAL data is set and stored in association with the registration number. The registration number specified in the setting item 606 is a number for classifying and registering data among a plurality of pieces of CAL data. Even when one user uses the line-of-sight input function of the digital camera 100, if CAL data is acquired and set separately for each case in which the user uses the camera with the naked eye or the user wears glasses (contact lenses), it is possible to achieve higher accuracy in the line-of-sight input. When a digital camera 100 is used by a plurality of users rather than by a specific one user, it is possible to achieve higher accuracy in the line-of-sight position if CAL data is acquired and set separately for each user. Therefore, in the present embodiment, five pieces of CAL data with registration numbers 1 to 5 can be registered in the digital camera 100. If the user never performs calibration, no CAL data is set and stored in any of the registration numbers. As described above, CAL data is stored in association with the orientation of the digital camera 100. Note that CAL data associated with each of horizontal and vertical orientations can be set and stored, for example, in registration number "1", but different registration numbers are not assigned respectively to CAL data associated with the horizontal orientation and CAL data associated with the vertical orientation. In FIG. 6B, the line-of-sight input function is enabled, the line-of-sight pointer display is enabled, and the line-of-sight determination function by SW1 is disabled. That is, a user's line-of-sight position is detected, and a pointer is displayed on an LV image on the EVF 29. In response to the operation of the line-of-sight determination, the AF frame moves to the line-of-sight position and AF is executed. However, the AF frame does not move to the line-of-sight position when the SW1 is pressed.

For each registration number, whether or not CAL data has been registered and set is displayed on the setting menu screen. In FIG. 6B, the item 606b indicates that no CAL data is set for the registration number "1" indicated by the item 606a. If CAL data has already been set, a circle is displayed in the item 606b but a cross mark is displayed when no CAL data has been set. However, this is merely an example. As described above, two pieces of data, one of which is associated with the vertical orientation of the digital camera 100 and the other one of which is associated with the horizontal orientation, can be set for each registration number. A cross mark is displayed only when no CAL data is set for either the horizontal orientation or the vertical orientation of the digital camera 100. Instead of displaying the setting status for the horizontal orientation using an icon as in the example described above, the setting status may be displayed using icons for the horizontal and vertical orientations, respectively. The setting status of the CAL data may not be displayed in the item 606, but detailed setting statuses may be displayed when the display is switched from the setting item 606 to a sub-setting item.

Figure 3:
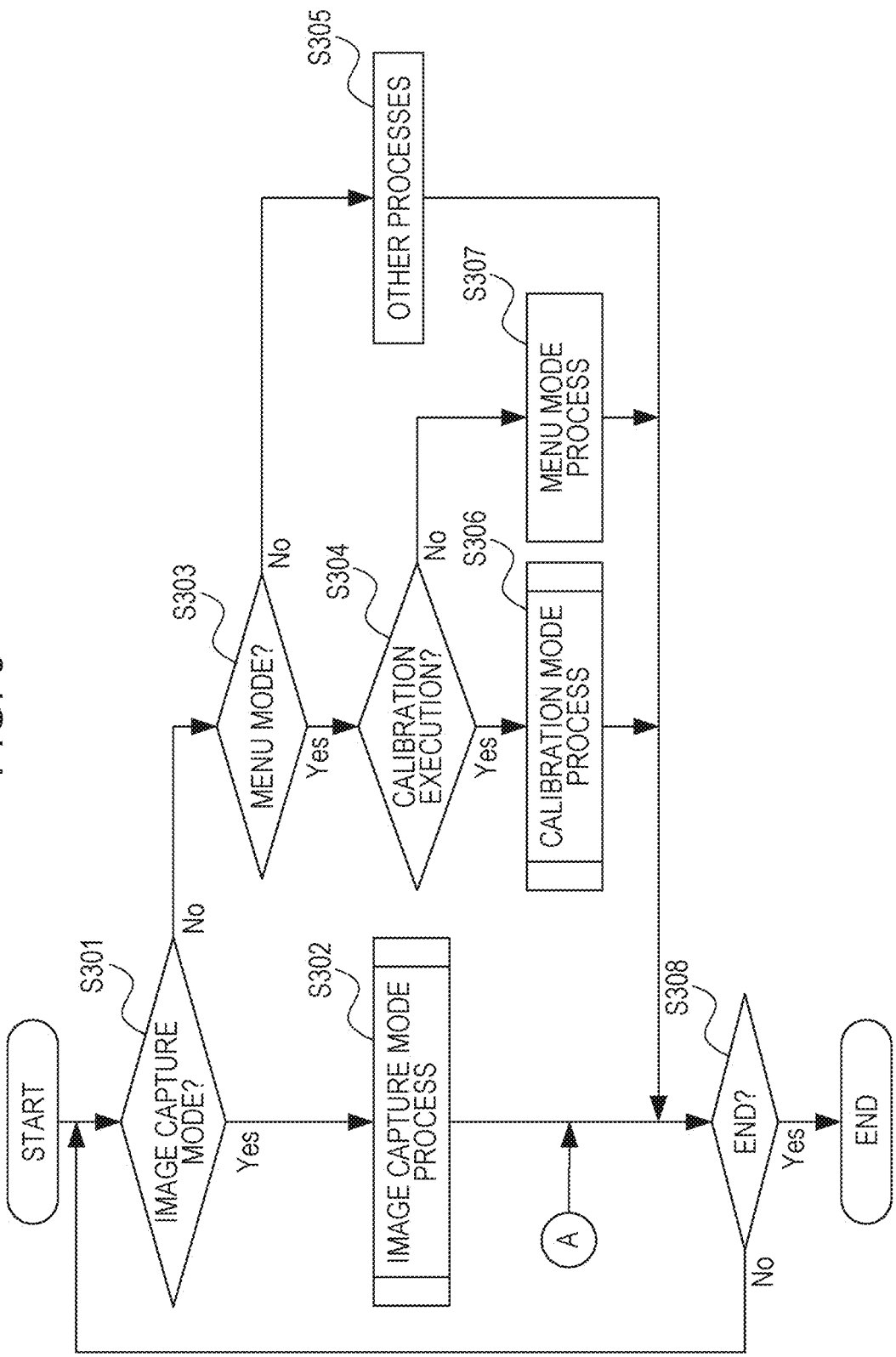
FIG. 3 is a diagram illustrating a flowchart of control processing of a digital camera.

FIG. 3 illustrates a flowchart of a control process that is started when the digital camera 100 is activated (when the power supply thereof is turned on). This control process is accomplished by the system control unit 50 by loading a program stored in the nonvolatile memory 56 into the system memory 52 and executing it.

In S301, the system control unit 50 determines whether or not the operation mode is the image capture mode. In a case where the current mode is the image capture mode, the process proceeds to S302, but otherwise, the process proceeds to S303.

In S302, the system control unit 50 performs an image capture mode process. The image capture mode process is described later with reference to FIG. 5.

In S303, the system control unit 50 determines whether or not the mode is the menu mode. If the mode is the menu mode, the process proceeds to S304, but otherwise, the process proceeds to S305.

In S304, the system control unit 50 determines whether or not the user has instructed, on the setting menu screen, to perform the calibration. In a case where the instruction to perform the calibration has been issued, the process proceeds to S306, but otherwise, the process proceeds to S307. More specifically, for example, when the setting item 605 in FIG. 6B is selected on the setting menu screen shown in FIG. 6, it is determined that the instruction to perform the calibration is issued.

In S305, the system control unit 50 performs other processing. Other processing refers, for example, to control processing for playing back a captured image, such as the processing in the playback mode.

In S306, the system control unit 50 performs a calibration (CAL) mode process. The CAL mode process is described below with reference to FIG. 4.

In S307, the system control unit 50 performs a menu mode process other than the CAL mode process. The menu mode process other than the CAL mode process refers to a process performed when a setting item other than those shown on the setting menu screen in FIG. 6A or 6B in the setting items (excluding setting item 605) is selected or when a setting item other than those shown in FIG. 6A or FIG. 6B is selected.

In S308, the system control unit 50 determines whether or not the process has been completed. In a case where the process has been completed, the control flowchart shown in FIG. 3 is ended, but otherwise, the process returns to S301. The ending of the process refers, for example, to turning off the power of the digital camera 100.

FIG. 4 is a control flowchart of the CAL mode process, described in S306 in FIG. 3. The process is started when it is determined Yes in S304 in FIG. 3, i.e., when it is determined that an instruction to perform the CAL mode process has been issued. Examples of information displayed on the EVF 29 in the CAL mode process are shown in FIGS. 7A to 7G.

Figure 7A:
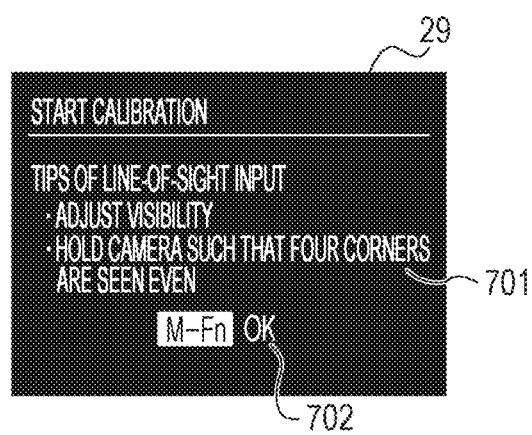
FIG. 7A is a diagram illustrating an example of a display in a calibration mode process according to an embodiment.
Figure 7B:
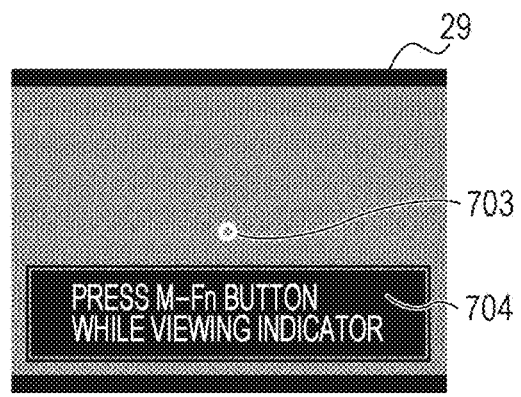
FIG. 7B is a diagram illustrating an example of a display in a calibration mode process according to an embodiment.
Figure 7C:
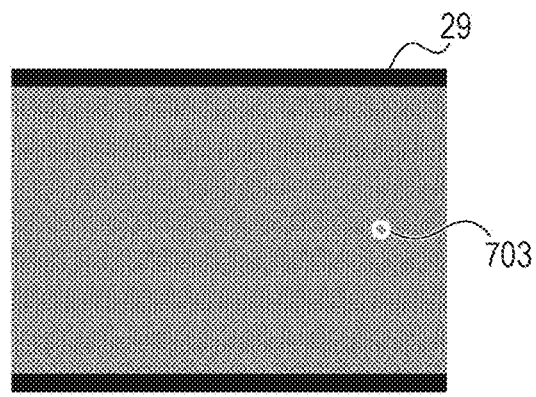
FIG. 7C is a diagram illustrating an example of a display in a calibration mode process according to an embodiment.
Figure 7D:
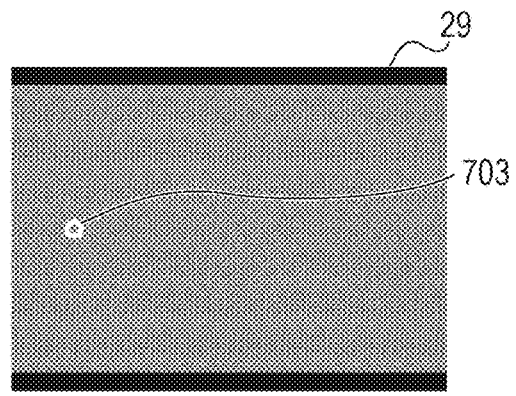
FIG. 7D is a diagram illustrating an example of a display in a calibration mode process according to an embodiment.
Figure 7E:
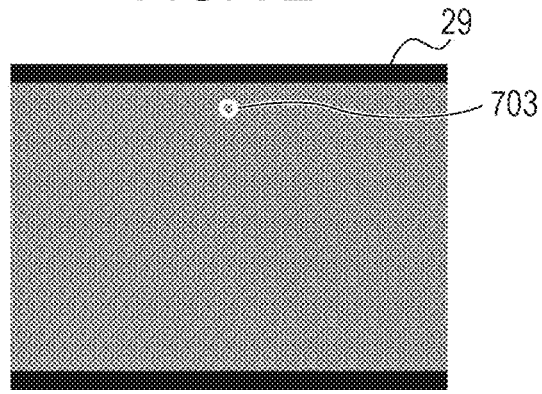
FIG. 7E is a diagram illustrating an example of a display in a calibration mode process according to an embodiment.
Figure 7F:
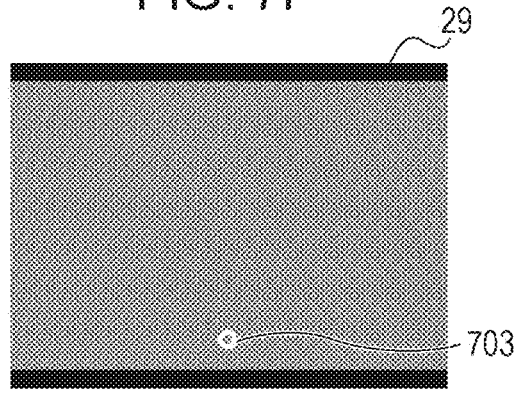
FIG. 7F is a diagram illustrating an example of a display in a calibration mode process according to an embodiment.

In S401, the system control unit 50 displays a calibration start screen. An example of the calibration start screen displayed on the EVF 29 is shown in FIG. 7A. In FIG. 7A, guidance 701 is displayed to provide tips for the calibration or advice on how to obtain user's line-of-sight data with higher accuracy. When an M-Fn button (not shown in FIGS. 1A and 1B) included in selection items 702 is pressed by the user, the screen changes to a screen (such as screens shown in FIGS. 7B to 7F) for acquiring the user's line-of-sight data.

In S402, the system control unit 50 acquires the orientation of the digital camera 100. More specifically, the orientation of the digital camera 100 with respect to the direction of gravity, at the time when the selection item 702 displayed on the EVF 29 is pressed in S401, is acquired using the posture detection unit 55 and stored in the nonvolatile memory 56. The orientation of the digital camera 100 acquired in this step is set (stored) as CAL data such that it is associated with the user's line-of-sight data described below. In this step, it is determined whether the digital camera 100 is oriented horizontally or vertically with respect to the direction of gravity. However, this is merely an example. A more detailed orientation of the camera may be acquired and stored from the orientations of the eyepiece 16 and/or the grip part 90 with respect to the direction of gravity.

In S403, the system control unit 50 displays a gaze point and acquires user's line-of-sight data. In the present embodiment, as shown in FIGS. 7B to 7F, a total of five gaze points are displayed one by one at different positions on the EVF 29, and user's line-of-sight data is acquired. Even in a case where the orientation of the digital camera 100 is changed during the process of sequentially displaying the total of five gaze points on the EVF 29, the line-of-sight data is stored in association with the orientation of the digital camera 100 obtained when the first line-of-sight data is acquired. As a specific example, consider a case where the orientation of the digital camera 100 is maintained horizontally during the acquisition of line-of-sight data at the first three gaze points, but the orientation is changed by the user to the vertical orientation at the time of the acquisition of line-of-sight data at the fourth gaze point. In such a case, although the orientation of the digital camera 100 at the time of the acquisition of the line-of-sight data at the fourth and the following gaze points is vertical, the line-of-sight data is stored in association with the camera orientation acquired in S402.

In S404, the system control unit 50 determines whether or not the acquisition of the user's line-of-sight data is completed for all five gaze points. In a case where the acquisition of data is completed, the process proceeds to S405. However, in a case where the acquisition of data is not completed for all five gaze points, the process proceeds to S411. Note that the completion of the acquisition of line-of-sight data is defined as the completion of the acquisition of line-of-sight data for all five gaze points shown in FIGS. 7B to 7F.

In S405, the system control unit 50 determines the orientation of the digital camera 100 acquired in S402. In a case where the digital camera 100 is oriented horizontally, the process proceeds to S406. However, in a case where the orientation is vertical, the process proceeds to S407. The line-of-sight data to be acquired in the CAL mode process can be set as CAL data corresponding to the orientation of the digital camera 100. This depends on the relative positional relationship between the line-of-sight detection block 160 located in the eyepiece 16 and the user's eye 161. When the digital camera 100 changes from the horizontal orientation to the vertical orientation, the relative positional relationship between the line-of-sight detection block 160 and the eye 161 also changes. This causes a change in the acquired data of reflected infrared light from the eye 161 detected by the line-of-sight detection block 160. Therefore, in a case where the CAL data is set for the horizontal orientation of the digital camera 100 and CAL is not set for the vertical orientation, if the user tries to use the line-of-sight input function in the vertical orientation, there is a possibility that a difference occurs between the position the user is looking at and the calculated gaze position. To calculate the line-of-sight position more accurately, it is desirable to acquire and set the CAL data for both cases in which the digital camera 100 is oriented horizontally and vertically.

In S406, the system control unit 50 stores the orientation (horizontal in this step) of the digital camera 100 and the acquired CAL data in the nonvolatile memory 56 such that the orientation and the CAL data are associated with each other. As a result, for example, the horizontal CAL data for the registration number specified in the display item 606a in FIG. 6B is set. In a case where the calibration has not been performed in the vertical orientation for the same registration number, the CAL data in the vertical orientation is not set. Note that in a case where the CAL data is set for at least one of the horizontal and vertical orientations of the digital camera 100, the CAL is said to be set at the registration number shown in the display item 606a in FIG. 6B. That is, in the case where the CAL data is set for at least one of the horizontal and vertical orientations of the digital camera 100, a circle (o) is assigned to the display item 606b. In FIG. 6B, the CAL data is not set in either the horizontal or vertical orientation of the digital camera 100, and thus a cross mark (x) is assigned to the display item 606b.

In S407, the system control unit 50 stores the orientation (vertical in this step) of the digital camera 100 and the acquired CAL data in the nonvolatile memory 56 such that the orientation and the CAL data are associated with each other.

Figure 7G:
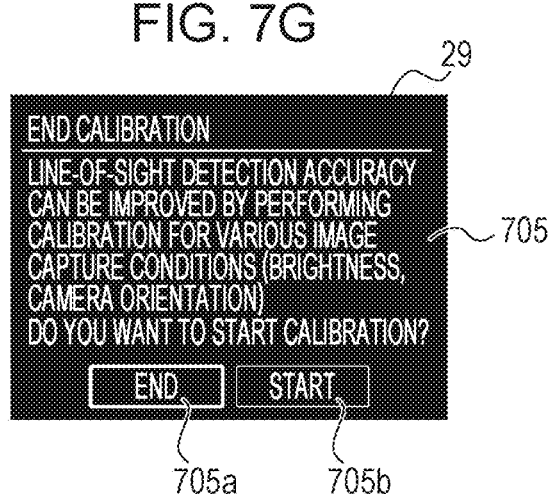
FIG. 7G is a diagram illustrating an example of a display in a calibration mode process according to an embodiment.

In S408, the system control unit 50 displays a calibration end screen. An example of the displayed calibration end screen is shown in FIG. 7G. By performing the calibration a plurality of times under various conditions and environments, it becomes possible to detect a more accurate line-of-sight position from the plurality of pieces of CAL data. As described above in S405, the CAL data can be more accurate when the CAL mode process is performed in both cases in which the digital camera 100 is in the horizontal orientation and in the vertical orientation. For these reasons, guidance 705 such as "If the calibration is performed under various image capture conditions (in terms of the ambient brightness, the camera orientation), it becomes possible to achieve higher accuracy in line-of-sight detection. Do you want to start the calibration?" may be displayed on the EVF 29 to prompt the user to perform the CAL mode process from the beginning under different conditions.

In S409, the system control unit 50 determines whether or not an instruction to end the calibration has been issued. In a case where the indication to end the calibration has been issued, the process proceeds S410. However, in a case where an instruction to continue the calibration is issued, the process returns to S401. The instruction to end the calibration is issued when the selection item 705*a* is selected from the end screen displayed in S406, shown in FIG. 7G. The instruction to continue the calibration is issued when the selection item 705*b* is selected. In this case, the control process in the CAL mode is performed from the beginning. In this situation, if the orientation of the digital camera 100 is changed, the line-of-sight data is acquired in the changed orientation and the CAL data is set in association with the orientation. For example, after the CAL is performed for the horizontal camera orientation for the registration number "1", if the CAL is then performed for the vertical camera orientation, two sets of data, including one set of data obtained in the horizontal orientation and one set of data obtained in the vertical orientation, are stored in the registration number "1".

In S410, the system control unit 50 determines whether or not the mode was the menu mode before the CAL mode process shown in FIG. 4 is performed. If it was the menu mode, the process proceeds to S307. However, if it was not the menu mode, that is, in a case where the CAL mode process was started in response to pressing a shortcut button 804*a* displayed in S515 in FIG. 5 described below, the process proceeds to S302.

If the determination in S404 is No, then S411, the system control unit 50 determines whether an instruction to cancel the CAL mode process is issued. If the cancel instruction is issued, the process proceeds to S412, but otherwise, the process returns to S403. The cancel instruction can occur when a mode switch operation such as pressing the playback button 79, pressing the shutter button 61, or pressing the menu button 81 is performed.

In S412, the system control unit 50 discards the acquired line-of-sight data (without storing it as CAL data). In this case, the determination in S404 is No, that is, the line-of-sight data has not been acquired for all five gaze points. In the present embodiment, in a case where the line-of-sight data is not acquired for all five gaze points, it is determined that the high accuracy of the CAL data cannot be guaranteed, and therefore the data is not registered as CAL data. In this step, not only the line-of-sight data but also the camera orientation obtained in S402 is discarded. After the line-of-sight data is discarded in S412, the CAL mode process is ended (and the processing flow returns to S308 shown in FIG. 3).

Figure 5A:
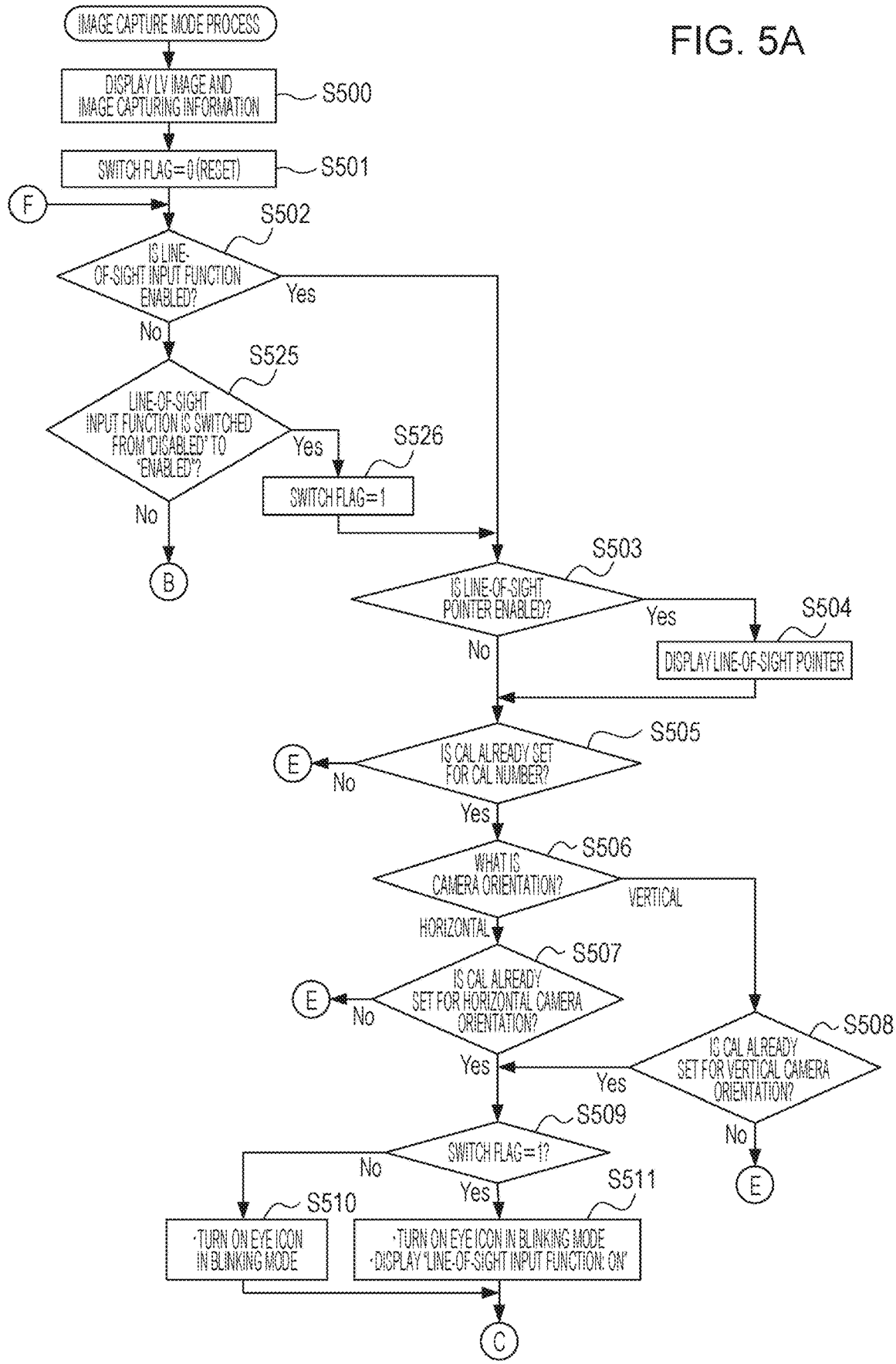
FIGS. 5A to 5C are diagrams illustrating a flowchart of control processing in terms of the orientation of a digital camera 100 and displaying guidance in an image capture mode process.
Figure 5B:
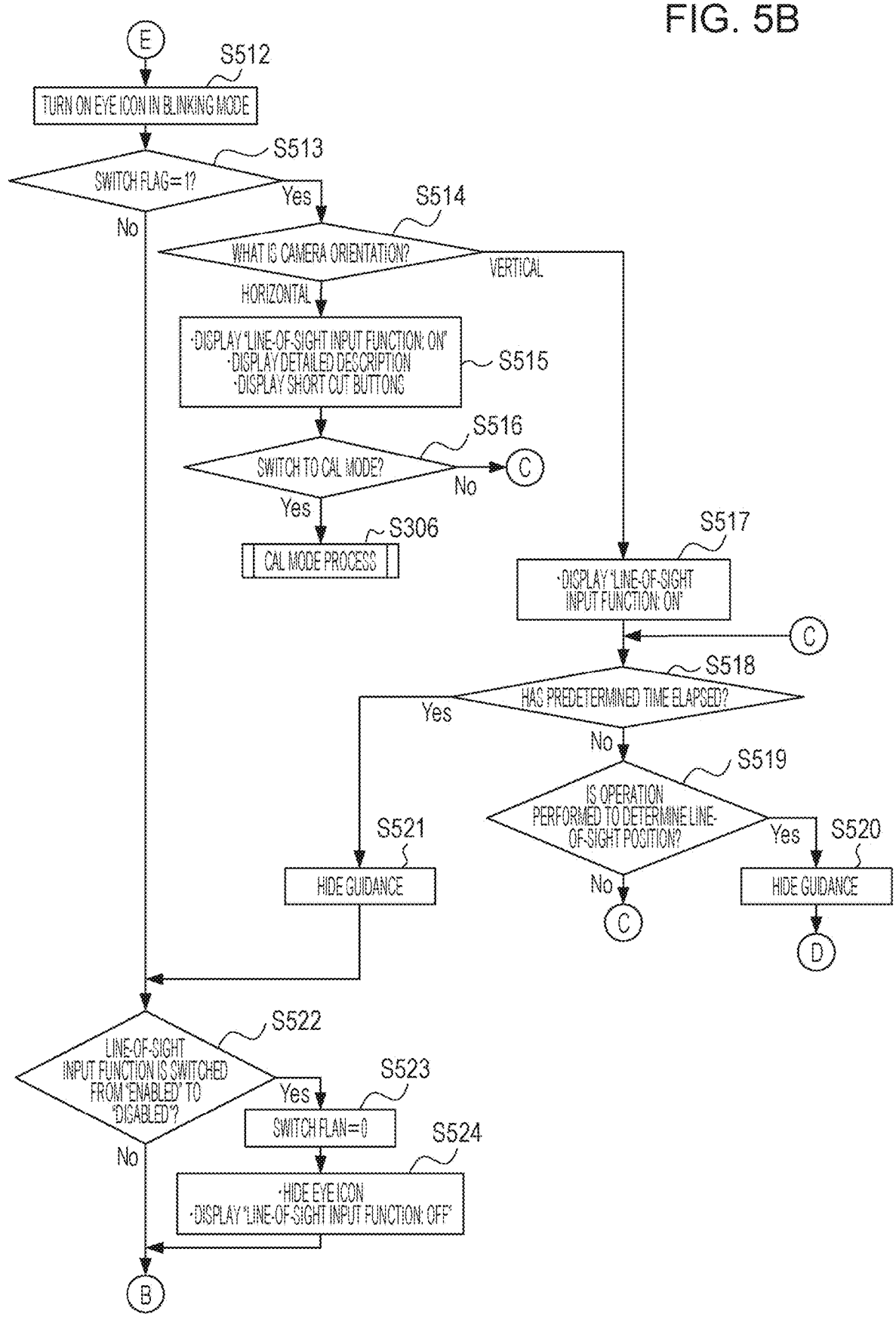
Figure 5C:
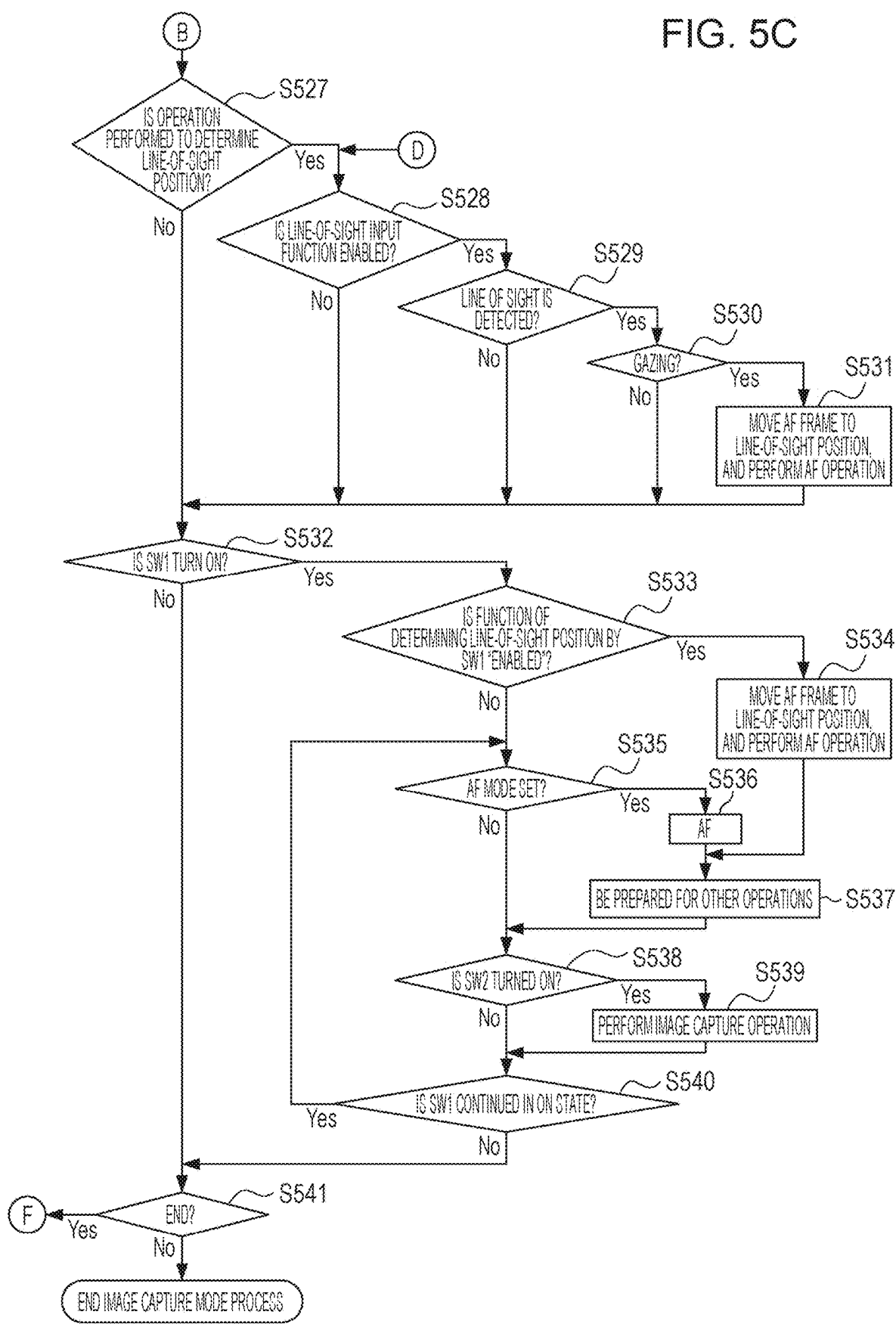

FIG. 5 is a control flowchart of the image capture mode process described in S302 in FIG. 3. This process is started when it is determined Yes in S301 in FIG. 3, that is, when it is determined that the current mode is the image capture mode.

Figure 8C:
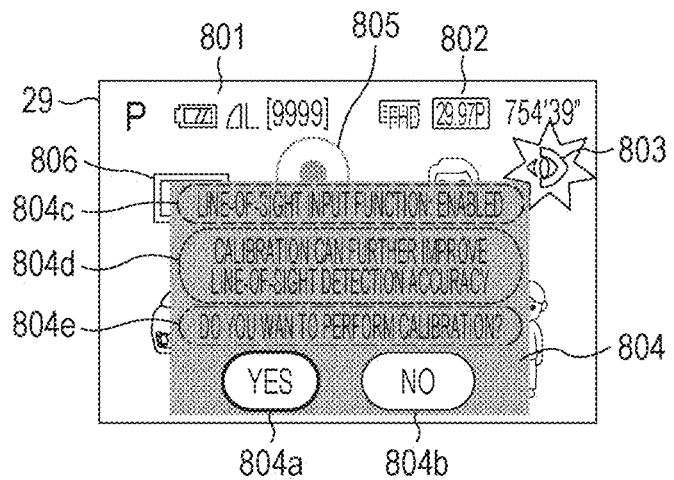
FIG. 8C is a diagram illustrating an example of a display of an orientation of a digital camera 100 and a display of guidance.
Figure 8D:
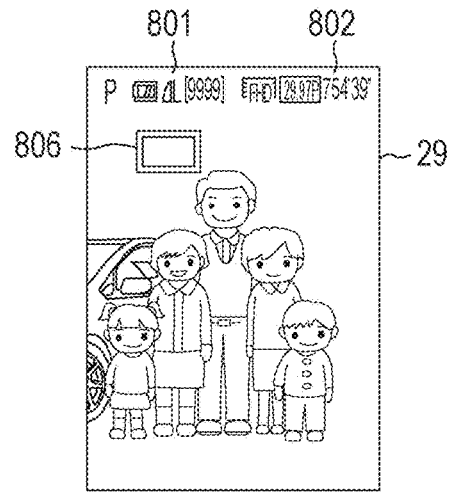
FIG. 8D is a diagram illustrating an example of a display of an orientation of a digital camera 100 and a display of guidance.

In S500, the system control unit 50 displays, on the EVF 29, the live view image captured by the imaging unit 22, settings related to the current image capture mode, the image quality, and/or the like, and image capture parameters such as the shutter speed, the ISO sensitivity, and/or the like. Examples of displayed information are shown in FIG. 8A and FIG. 8D. In the example shown in FIG. 8A, the digital camera 100 is in the horizontal orientation, while in the example shown in FIG. 8D, the digital camera 100 is in the vertical orientation. LV 801, image capturing information 802, and an AF frame 806 are displayed on the EVF 29.

In S501, the system control unit 50 resets a switch flag (such that the switch flag=0). The switch flag is a flag associated with switching between enabling and disabling the line-of-sight input function specified in the setting item 602 in FIGS. 6A and 6B, and is stored in the system memory 52. In the present embodiment, the switch flag is set such that the switch flag=1 when the line-of-sight input function is switched from "disabled" to "enabled" by the user after the power of the digital camera 100 is turned on. In a case where the line-of-sight input function is switched from "enabled" to "disabled" by the user, or in a case where the line-of-sight input function is maintained in the "disabled" or "enabled" without being switched after the power of the turned on, the switch flag=0.

In S502, the system control unit 50 refers to the system memory 52 and determines whether or not the line-of-sight input function is enabled (according to the setting specified in the setting item 602). If enabled, the process proceeds to S503, but otherwise, the process proceeds to S523.

In S503, the system control unit 50 determines whether or not the line-of-sight pointer display setting specified in the setting item 603 in FIG. 6B is enabled. If enabled, the process proceeds to S504, but if disabled, the process proceeds to S505.

In S504, the system control unit 50 displays a line-of-sight pointer at a user's line-of-sight position, which is detected by the line-of-sight detection block 160 and calculated taking into account the CAL data (if the CAL mode process has never been performed by the user, the CAL data is not taken into account). The line-of-sight pointer is displayed so as to be superimposed on the LV image displayed on the EVF 29. The line-of-sight pointer is displayed, as described above, in the same manner as the pointer 805 in FIG. 8B.

In S505, the system control unit 50 determines whether or not the CAL mode process has already been performed for the current CAL registration number. If the CAL mode process has already been performed, the process proceeds to S506, but if not, the process proceeds to S512. In this step, if the CAL mode process has been performed at least once for the current registration number regardless of the orientation of the digital camera 100, it is determined that the CAL mode process has been performed. The current registration number is displayed on the setting menu screen or on the EVF 29 as is in the display item 606*a* in FIG. 6B, or displayed on the EVF 29 or on the outside-viewfinder display unit 43 in the image capture mode when the line-of-sight input function is enabled.

In S506, the system control unit 50 determines the orientation of the housing of the digital camera 100. If the housing is oriented horizontally, the process proceeds to S507, but if it is oriented vertically, the process proceeds to S508. The orientation of the housing of the digital camera 100 can be detected by the posture detection unit 55. When the digital camera 100 is horizontal with respect to the direction of gravity, that is, in the present embodiment, when the eyepiece 16 is perpendicular to the direction of gravity, the digital camera 100 is determined to be horizontally oriented. In this determination, the direction in which the eyepiece 16 is oriented with respect to the direction of gravity is not taken into account. When the digital camera 100 is vertical, i.e., in the present embodiment, when the eyepiece 16 is along the direction of gravity and the grip part 90 is located above or below in the direction of gravity, it is determined that the digital camera 100 is oriented vertically.

In S507, the system control unit 50 determines whether the CAL data has already been set in the horizontal orientation of the camera. In the case where the CAL data has already been set in the horizontal orientation of the camera, the process proceeds to S509. However, in the case where the CAL data has not been set in the horizontal orientation, the process proceeds to S512. In the present example, it is determined in S506 that the current orientation of the digital camera 100 is horizontal. That is, in the case where it is determined Yes in this step, it is possible to accurately detect the line of sight using the CAL data already set. On the other hand, in a case where it is determined No in this step, there is a possibility that when the user holds the digital camera 100 in the horizontal orientation, the line-of-sight position is displayed at a position different from a position at which the user is looking unless calibration is performed. That is, there is a possibility that a discrepancy occurs between the position seen by the user and the detected line-of-sight position, which causes the user to feel that it is difficult to use the line-of-sight input function.

In S508, the system control unit 50 determines whether or not the CAL data has already been set in the vertical orientation of the camera. In a case where the CAL data has already been set in the vertical orientation of the camera, the process proceeds to S509, but in a case where the CAL data has not been set in the vertical orientation of the camera, the process proceeds to S512. The determination in this step may be accomplished by performing the determination for the vertical orientation in the same manner as for the horizontal orientation in S507.

In S509, the system control unit 50 refers to the system memory 52 and determines whether the switch flag=1. If the switch flag=1, the process proceeds to S511, but otherwise (if the switch flag=0), the process proceeds to S510. As described in S501, the switch flag=1 indicates that the line-of-sight input function was switched from "disabled" to "enabled" after the power of the digital camera 100 was turned on.

Figure 8E:
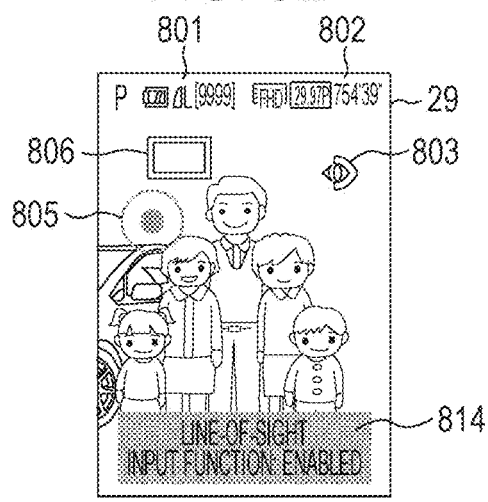
FIG. 8E is a diagram illustrating an example of a display of an orientation of a digital camera 100 and a display of guidance.
Figure 8F:
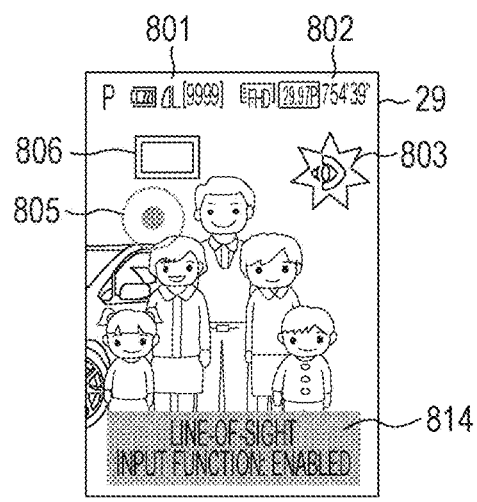
FIG. 8F is a diagram illustrating an example of a display of an orientation of a digital camera 100 and a display of guidance.
Figure 8G:
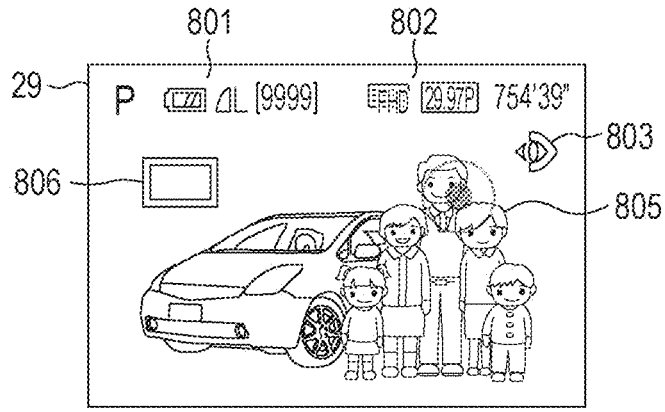
FIG. 8G is a diagram illustrating an example of a display of an orientation of a digital camera 100 and a display of guidance.

In S510, the system control unit 50 displays an icon 803 on the EVF 29. FIG. 8G illustrates an example of information displayed in this situation. The determination as No in S509 indicates that the setting of the line-of-sight input function has not been changed after the power of the digital camera 100 was turned on, that is, the line-of-sight input function was enabled when the power of the digital camera 100 was turned on. In the present embodiment, the guidance 814/824 is displayed each time the setting of the line-of-sight input function is switched between "enabled" and "disabled", regardless of the camera orientation or the CAL data setting, and thus it can be assumed that the user is likely to be aware of whether the line-of-sight input function is enabled or disabled. Therefore, it is assumed that only the displaying of the icon 803 is sufficient, and thus only the icon 803 is displayed for notification.

In S511, the system control unit 50 displays an icon 803 representing the shape of the eye on the EVF 29 to indicate that the line-of-sight input function is enabled, and displays text information "Line-of-sight input: ON" (guidance 814). Examples of screens displayed in this situation are shown in FIG. 8B and FIG. 8E. The determination of Yes in S509 indicates that the line-of-sight input function was switched to "enabled". Therefore, the guidance 814 informs the user that the line-of-sight input function has been switched from the "disabled" to "enabled" in the manner that allows the user to recognize it more easily. In the present embodiment, in a case where the line-of-sight input function is switched to enabled from disabled even once after the power of the digital camera 100 is turned on, the switch flag is set to 1 (the switch flag=1), but this is merely an example and not limitation. For example, the switch flag is set to 1 only when the line-of-sight input function is switched to "enabled" from "disabled" after the image capture mode process shown in FIG. 5 is started. In this case, when the mode is changed by the user such that "the line-of-sight input function is enabled"→"the screen is changed to the setting menu screen (the menu mode operation)"→"the mode is changed to the image capture mode", the notification by the guidance 814 is not provided to this user (although the icon 803 is displayed). That is, the guidance 814 is not repeatedly displayed, and this makes it less cumbersome for the user who knows that the line-of-sight input function has been switched to "enabled".

After the icon 803 or the guidance 814 is displayed in S510 or S511, the process proceeds to S518.

Since the determination in S505 is No, the system control unit 50 turns on the icon 803 in S512 such that it blinks. This makes it easier for the user to visually recognize that the CAL data has not been set.

In S513, similarly to S509, the system control unit 50 determines whether or not the switch flag=1. If the switch flag=1, the process proceeds to S514, but otherwise (the switch flag=0), the process proceeds to S522.

In S514, the system control unit 50 determines the orientation of the digital camera 100, as in S506. If it is horizontal, the process proceeds to S515, but if it is vertical, the process proceeds to S517.

In S515, the system control unit 50 displays the guidance 804 superimposed on the LV image displayed on the EVF 29. More specifically, text information (guidance 804c) indicating that the line-of-sight input function is enabled, and a description (guidance 804d) regarding the effect of the calibration are displayed. In addition, text information (guidance 804e) prompting to proceed to the CAL mode process and items (shortcut buttons 804a and 804b) that allow it to easily proceed to the CAL mode process are also displayed. FIG. 8C illustrates an example of information displayed in this situation. Details of the displayed information are described later. The determination of No in S505 and the determination of Yes in S513 indicate that the user has never used the line-of-sight input function. Therefore, it is likely that the user does not know that it is better to execute CAL and set the CAL data in a specific registration number to use the line-of-sight input function. Therefore, the message 804 is displayed to inform the user that it is possible to achieve higher accuracy in the line-of-sight input function by performing the CAL first and then using the line-of-sight input function. When the user is trying to capture an image using the line-of-sight input function in the image capture mode, it may be troublesome for the user to switch to the setting menu screen and perform the CAL mode process. To handle the above situation, a shortcut button (shortcut button 804a) is displayed to allow easy transition to the CAL mode process. By selecting the shortcut button 804b, the user can proceed to the next operation without performing CAL again. Since power is consumed when the line-of-sight input function is enabled, that is, when operation of the line-of-sight detection block 160 consumes power, if the user is not aware that the line-of-sight input function is enabled, power will be consumed contrary to the user's intent, resulting in a decrease in battery power. Therefore, in addition to the icon 803, the guidance 804 is displayed so as to be superimposed on the LV image such that the user can more clearly recognize that the line-of-sight input function is enabled. The guidance 804 includes guidance 804c, 804d, and 804e and shortcut buttons 804a, 804b. In the present embodiment, the guidance 804 is displayed when the camera is oriented horizontally. Alternatively, only the guidance 804c to 804e may be displayed without displaying the shortcut buttons 804a and 804b.

In S516, the system control unit 50 determines whether or not the shortcut button 804a is selected from the shortcut buttons 804a and 804b described in S515, that is, whether or not an instruction to proceed to the CAL mode process has been given. If the instruction to proceed to the CAL mode process has been given, the process proceeds to S306 in FIG. 3 (in which the CAL mode process is to be performed). In a case where the instruction is not given, that is, when the shortcut button 804b is selected, the process proceeds to S518.

In S517, the system control unit 50 displays the guidance 814 superimposed on the LV image displayed on the EVF 29. In this step, unlike S515, only "Line-of-sight input function: On" (the guidance 814) is displayed, and the guidance 804d and 804e and the shortcut buttons 804a and 804b are not displayed (FIG. 8F). Note that the displaying in this step may not performed depending on the line-of-sight determination operation by the user or the elapse of a predetermined period of time.

In S518, the system control unit 50 determines whether or not a predetermined time has elapsed since the guidance 804 (displayed in S515) or the guidance 814 (displayed in S517) was displayed. If the predetermined time has passed, the process proceeds to S519, but otherwise, the process proceeds to S521.

In S519, the system control unit 50 determines whether or not a line-of-sight determination operation is performed. If the line-of-sight determination operation is performed, the process proceeds to S520. If the line-of-sight determination operation is not performed, the process returns to S518.

In S520, the system control unit 50 hides the guidance 804 displayed in S515 or the guidance 814 displayed in S517. The icon 803 is not hidden. This is because the icon 803 is displayed withing a small area, and thus displaying the icon 803 together with other image capturing information is less likely to bother the user when an image is captured. by continuing to display the icon 803 on the EVF 29, the user can always visually recognize whether the line-of-sight input function is enabled or disabled. On the other hand, since the guidance 804c to 804e and the shortcut buttons 804a and 804b are displayed superimposed on the LV image as shown in FIGS. 8A to 8I, their continuous display will reduce the visibility of the LV image.

In S521, similarly to S520, the system control unit 50 hides the guidance 804 displayed in S515 or the guidance 814 displayed in S517.

In S522, the system control unit 50 determines whether or not the line-of-sight input function has been switched from enabled to disabled. If so, the process proceeds to S523, but otherwise, the process proceeds to S527.

In S523, the system control unit 50 sets the switch flag to 0 and stores it in the system memory 52.

Figure 8H:
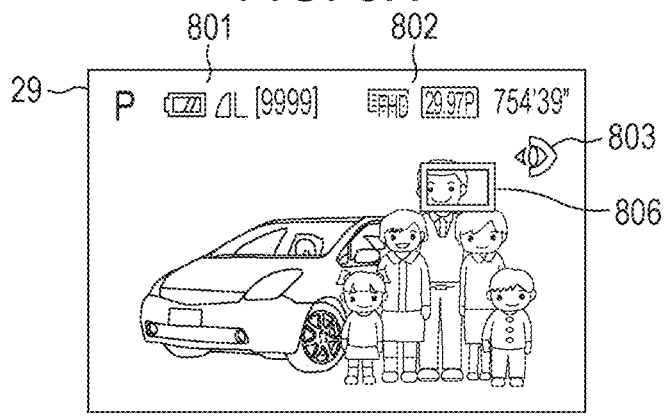
FIG. 8H is a diagram illustrating an example of a display of an orientation of a digital camera 100 and a display of guidance.
Figure 8I:
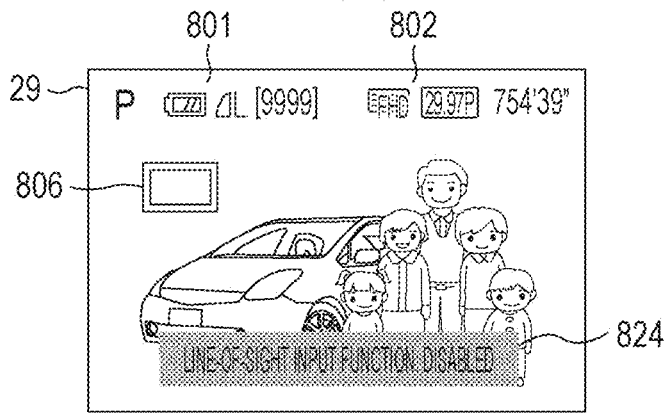
FIG. 8I is a diagram illustrating an example of a display of an orientation of a digital camera 100 and a display of guidance.

In S524, the system control unit 50 hides the icon 803 displayed on the EVF 29, displays the guidance 824 "Line-of-sight input function: disabled" on the EVF 29, and informs the user that the line-of-sight input function has been disabled. An example of the display on the EVF 29 in this situation display is shown in FIG. 8I. FIG. 8I shows an example of the display when the digital camera 100 is oriented horizontally, but the display is similar when the digital camera 100 is oriented vertically. The guidance 824 displayed in this step is hidden when a predetermined time has elapsed after being displayed on the EVF 29, as described in S518. If the operation is performed to determine line-of-sight position before the predetermined time elapses, the guidance 824 is hidden, and the process proceeds to S527.

When it is determined in S502 No, the system control unit 50 determines in S525 whether or not the line-of-sight input function has been switched from disabled to enabled. If switched, the process proceeds to S526, but otherwise, the process proceeds to S527.

In S526, the system control unit 50 sets the switch flag to 1, and stores it in the system memory 52. The process then returns to S503.

In S527, similarly to S519, the system control unit 50 determines whether or not an operation to determine the line-of-sight position is performed. If the line-of-sight determination operation is performed, the process proceeds to S528, but otherwise, the process proceeds to S532.

In S528, similarly to S502, the system control unit 50 determines whether or not the line-of-sight input function is set to be enabled. If enabled, the process proceeds to S529, but not enabled, the process proceeds to S532.

In S529, the system control unit 50 determines whether or not a line of sight is detected. In a case where a line of sight of a user is detected by the line-of-sight detection block 160, it is determined that a line of sight is detected and the process proceeds to S530. If no line of sight is detected, the process proceeds to S532.

In S530, the system control unit 50 determines whether or not a gaze is detected. If a gaze is detected, the process proceeds to S531, but otherwise, the process proceeds to S532.

In S531, the system control unit 50 moves the AF frame to a position corresponding to a user's line-of-sight position on the EVF 29 detected/calculated by the line-of-sight detection block 160 as of when the line-of-sight position is determined in S527, and the system control unit 50 performs the AF operation. FIG. 8H illustrates an example of the display in this situation. When the line-of-sight determination operation is performed by the user in the state in which the pointer 805 indicating the position pointed to by the line of sight by the user is at the position shown in FIG. 8G, the AF frame 806 is moved to the position of the pointer 805 (the user's line-of-sight position), and the AF operation is performed.

In S532, the system control unit 50 determines whether or not the first shutter switch 62 is turned on. If it is turned on, the process proceeds to S533, but otherwise, the process proceeds S541. The state in which the first shutter switch 62 is ON refers to a state in which the shutter button 61 is half-pressed as described above. That is, it can be assumed that the user is going to capture an image.

In S533, the system control unit 50 refers to the nonvolatile memory 56 and determines whether or not the function of determining the line-of-sight position by SW1 is set to be "enabled" (in the setting item 604 in FIG. 6B). If "enabled", the process proceeds to S534, but if "disabled", the process proceeds to S535.

In S534, the system control unit 50 moves the AF frame to a position corresponding to a user's line-of-sight position on the EVF 29 detected/calculated by the line-of-sight detection block 160 as of when the first shutter switch is turned on in S532, and the system control unit 50 performs the AF operation.

In S535, the system control unit 50 determines whether or not the focus mode is set to the AF mode. If the AF mode is set, the process proceeds to S536, but otherwise (if the MF mode is set), the process proceeds to S538. Switching between the AF mode and the MF mode is performed on the setting menu screen or using a switch provided outside the lens unit 150, or the like.

In S536, the system control unit 50 performs the AF process based on the position where the AF frame is displayed.

In S537, the system control unit 50 performs an operation to prepare for other image capture operations such as AE and AWB.

In S538, the system control unit 50 determines whether or not the second shutter switch 64 is turned on. If the second shutter switch 64 is turned on, i.e., the shutter button 61 is fully pressed, the process proceeds to S539, but otherwise, the process proceeds to S540. In the present embodiment, it is assumed that the image capture instruction is issued when the shutter button 61 is fully pressed, but the image capture instruction may be issued, for example, when an icon displayed on the touch panel 70a is touched.

In S539, the system control unit 50 performs a series of steps of the image capture operation up to storing the captured image as an image file on the recording medium 200.

In S540, the system control unit 50 determines whether or not the first shutter switch 62 remains in the ON state. If so, the process proceeds to S534, but otherwise, the process proceeds to S541.

In S541, the system control unit 50 determines whether or not the image capture mode has ended. When the image capture mode ends, the control flowchart in FIG. 4A is ended, and the process returns to S308 in FIG. 3. If the image capture mode has not ended, the process returns to S502. The end of the image capture mode refers to, for example, switching to the setting menu screen by turning off the power of the digital camera 100 or pressing the menu button 81.

When it is determined in S529 that a line of sight of the user is detected, the AF frame may be moved to the position corresponding to the detected line of sight and the AF operation may be performed without performing the determination on gazing in S530. That is, S530 may be skipped, and the process may proceed from S529 to S531.

FIGS. 8A to 8I illustrate examples of displays given on the EVF 29 in the image capture mode process according to the orientation of the digital camera 100 and the setting of CAL data for the registration number.

FIG. 8A is an example of the display on the EVF 29 when the digital camera 100 is oriented horizontally and the line-of-sight input function is disabled. LV 801 is displayed on the EVF 29, and the nonvolatile memory 56 is referred to, and the image capture information 802 and the AF frame 806 are displayed together with LV.

FIG. 8B shows a state in which the digital camera 100 is horizontally oriented, the line-of-sight input function is enabled, the line-of-sight pointer display is enabled, and CAL for the horizontal orientation has already been registered in the current registration number. When the digital camera 100 enters the image capture standby mode in a state in which the line-of-sight input function has been enabled after the power of the digital camera 100 is turned on, the display such as that shown in FIG. 8B is given. In addition to the display shown in FIG. 8A, an icon 803 and guidance 814 are displayed to indicate that the line-of-sight input function is enabled.

FIG. 8C shows an example of the display given when the digital camera 100 is horizontally oriented, the line-of-sight input function is enabled, the line-of-sight pointer display is enabled, and CAL for the horizontal orientation is not set in the current registration number. In addition to the LV 801, the image capturing information 802, the pointer 805, and the AF frame 806 displayed on the EVF 29, the icon 803 is displayed such that it blinks. Then, "Line-of-sight input function: enabled" (guidance 804c) is displayed, and a description of the effect of the calibration (guidance 804d) is displayed. In addition, text information (guidance 804e) prompting to switch to the CAL mode process and shortcut buttons 804a and 804b for easily switching and prompting to switch to the CAL mode process are displayed. In the state shown in FIG. 8C, the user has not performed CAL for the horizontal orientation.

Therefore, a more visually recognizable notification is given to prompt the user to perform the calibration and register the CAL data. Note that the guidance 804 has a larger display area and/or a larger number of sentences (a larger number of characters) than the guidance 814 described later with reference to FIG. 8F. When the digital camera 100 is oriented horizontally, there is a possibility that the user is attempting to use the line-of-sight input function for the first time, or the user is holding the digital camera 100 and has unintentionally enabled the line-of-sight input function. The user may hold the digital camera 100 without intending to immediately start capturing an image, but the user may be performing various settings in preparation for capturing an image. In such a case, even if the large-area guidance 804 shown in FIG. 8C is displayed superimposed on the LV image, the user is less likely to feel annoyed. Furthermore, displaying a blinking icon 803 along with the guidance 804 makes it unlikely that the user will overlook the fact that CAL has not yet been set, and makes it easier to switch to the CAL mode process. Although the sentences of the guidance 804c to 804e are each surrounded by dotted lines in FIG. 8C, this is only for ease of explanation, and the dotted lines are not actually displayed together with the sentences.

FIG. 8D shows an example of the display on the EVF 29 when the digital camera 100 is oriented vertically and the line-of-sight input function is disabled. LV 801 is displayed on the EVF 29, and the nonvolatile memory 56 is referred to, and the image capture information 802 and the AF frame 806 are displayed together with LV. Although the example of the display is roughly similar to that shown in FIG. 8A, but it is different in that the digital camera 100 is oriented vertically, and thus the layout of the display changes according to the display area of the EVF 29.

FIG. 8E shows a state in which the digital camera 100 is vertically oriented, the line-of-sight input function is enabled, the line-of-sight pointer display is enabled, and CAL for the vertical orientation has already been registered in the current registration number. When the digital camera 100 enters the image capture standby mode in a state in which the line-of-sight input function has been enabled after the power of the digital camera 100 is turned on, the display such as that shown in FIG. 8E is given. In addition to the display shown in FIG. 8D, an icon 803 and guidance 814 are displayed to indicate that the line-of-sight input function is enabled.

FIG. 8F shows an example of the display when the digital camera 100 is oriented vertically, the line-of-sight input function is enabled, the line-of-sight pointer display is enabled, and CAL for the vertical orientation is not set in the current registration number. In addition to the LV 801, the image capturing information 802, the pointer 805, and the AF frame 806 displayed on the EVF 29, the blinking icon 803 and "Line-of-sight input function: enabled" (guidance 814) are displayed. In the state shown in FIG. 8F, the user has not performed the calibration for the vertical orientation. However, since the digital camera 100 is oriented vertically, the user is more likely to check the composition of the entire image or wait for a shutter opportunity compared to when the digital camera 100 is oriented horizontally. The guidance 814 shown in FIG. 8F has a smaller display area/less text (fewer characters) than the guidance 804 shown in FIG. 8C. Although the guidance display area is small, the blinking of the icon 803 lets the user know that the CAL data has not been set. This makes it easier for the user to see the live-view image and less likely to miss a shutter release opportunity.

FIG. 8G shows a state in which the digital camera 100 is horizontally oriented, the line-of-sight input function is enabled, the line-of-sight pointer display is enabled, and CAL for the horizontal orientation has already been registered in the current registration number. When the digital camera 100 enters the image capture standby mode in a state in which the line-of-sight input function has been enabled after the power of the digital camera 100 is turned on, the display such as that shown in FIG. 8G is given. The same display is made when the digital camera 100 is in vertical orientation and the CAL is already registered in vertical orientation with the current CAL registration number.

FIG. 8H shows an example of the display on the EVF 29 when the user performs an operation to determine the line-of-sight position gazed at by the user in the state in which the digital camera 100 is oriented horizontally, the line-of-sight input function is enabled, and the line-of-sight pointer display is enabled. Instead of the pointer 805, an AF frame 806 set based on the position of the pointer 805 is displayed. By temporarily hiding the pointer 805 in response to the operation of determining the line-of-sight position, the AF frame and the subject in the LV image become easier to see. The temporarily hidden pointer 805 is displayed again when a predetermined time elapses or when the second shutter switch 64 is turned off.

FIG. 8I shows a state in which the digital camera 100 is horizontally oriented, the line-of-sight input function is disabled, and CAL for the vertical orientation has already been registered in the current registration number. More specifically, this is the state when the line-of-sight input function is switched from enabled to disabled by a user operation. In response to disabling the line-of-sight input function from the state shown in FIG. 8H, the icon 803 is hidden and the guidance 824 is displayed. The displayed guidance allows the user to visually recognize that the line-of-sight input function has been disabled. The icon 803 is not displayed even after the guidance 824 is hidden, for example, because a predetermined period of time has elapsed, and thus the user can recognize that the line-of-sight input function is currently disabled.

Although the icon 803 is turned on or blinked to indicate whether the calibration has been performed or not, this is merely by way of example and not limitation. Alternatively, the color of the icon may be changed, or an icon may be displayed in different forms depending on whether the calibration has been performed or not. The icon 803 is assumed to be in the shape of an eye, but this is only by way of example and not limitation.

As described above, in the present embodiment, the display is properly changed depending on the orientation of the digital camera 100. When the digital camera 100 is in the horizontal orientation and the CAL data is not set, if the line-of-sight input function is enabled, the display (guidance 803) is given so as to be superimposed on the live view image as follows. An icon (icon 803) indicating that CAL data is not yet set, information indicating that the line-of-sight input function is enabled, (guidance 804c), and text information prompting to switch to the CAL mode process (guidance 804d) are displayed. In addition, a display (guidance 804e) for an easy transition to the CAL mode process and for prompting to perform the CAL mode process, and items (shortcut buttons 804a and 804b) for an easy transition to the CAL mode process are displayed. These displays make it possible to prompt the user to perform calibration and set CAL data, and to transition to the CAL mode process without bothering the user. In the state in which the digital camera 100 is oriented vertically and the CAL data is not set, when the line-of-sight input function becomes enabled, only an icon indicating that the CAL data is not set and an indication that the line-of-sight input function becomes enabled are displayed. When the digital camera 100 is in the horizontal orientation, there is a possibility that the user is performing the process of setting the camera to capture an image, or the like, and the user is not necessarily holding the digital camera 100 with the intention of immediately capturing an image. On the other hand, when the digital camera 100 is in the vertical orientation, the user is likely to be composing the image before capturing it or is likely to be waiting for an opportunity to capture the image. In such a situation, if the display prompting the user to perform calibration is superimposed on the live-view image, the user may be distracted by the displayed guidance and may even miss the shutter release opportunity. Therefore, when the digital camera 100 is in the vertical orientation, the display should be as minimal as the user can perceive and should not interfere with capturing the image. By performing the control in the manner described above, it is possible to provide the display at an appropriate timing to prompt the user to set functions related to the control of the electronic device.

The control of the display has been described above which is performed according to the present embodiment depending on whether the calibration of the digital camera having the line-of-sight input function has been set (depending on the setting state), but this is only by way of example and is not limited to the setting state of the calibration. For an electronic device designed to be used in various orientations, if a user is allowed to set functions related to the control of the electronic device, the present application can be applied to the technique of changing the content of the display for notification to the user depending on the settings of the functions and the orientation of the electronic device. That is, when the electronic device is in an orientation in which a user is supposed to use the electronic device while focusing on the current content of the display, guidance displayed to notify the user is limited to the minimum necessary. When the electronic device is allowed to be used in various manners, in a case where the user is using the electronic device without focusing on the current display content, a display is given to prompt to change the setting. By performing the control in the manner described above, it is possible to give a display at a proper timing to prompt making settings according to the orientation of the electronic device, without annoying the user. As a modification, an application to a smartphone, which is a mobile terminal, is described below.

MODIFICATION

FIGS. 9A to 9F show examples of displays given when the present invention is applied to a mobile terminal such as a smartphone.

Figure 9A:
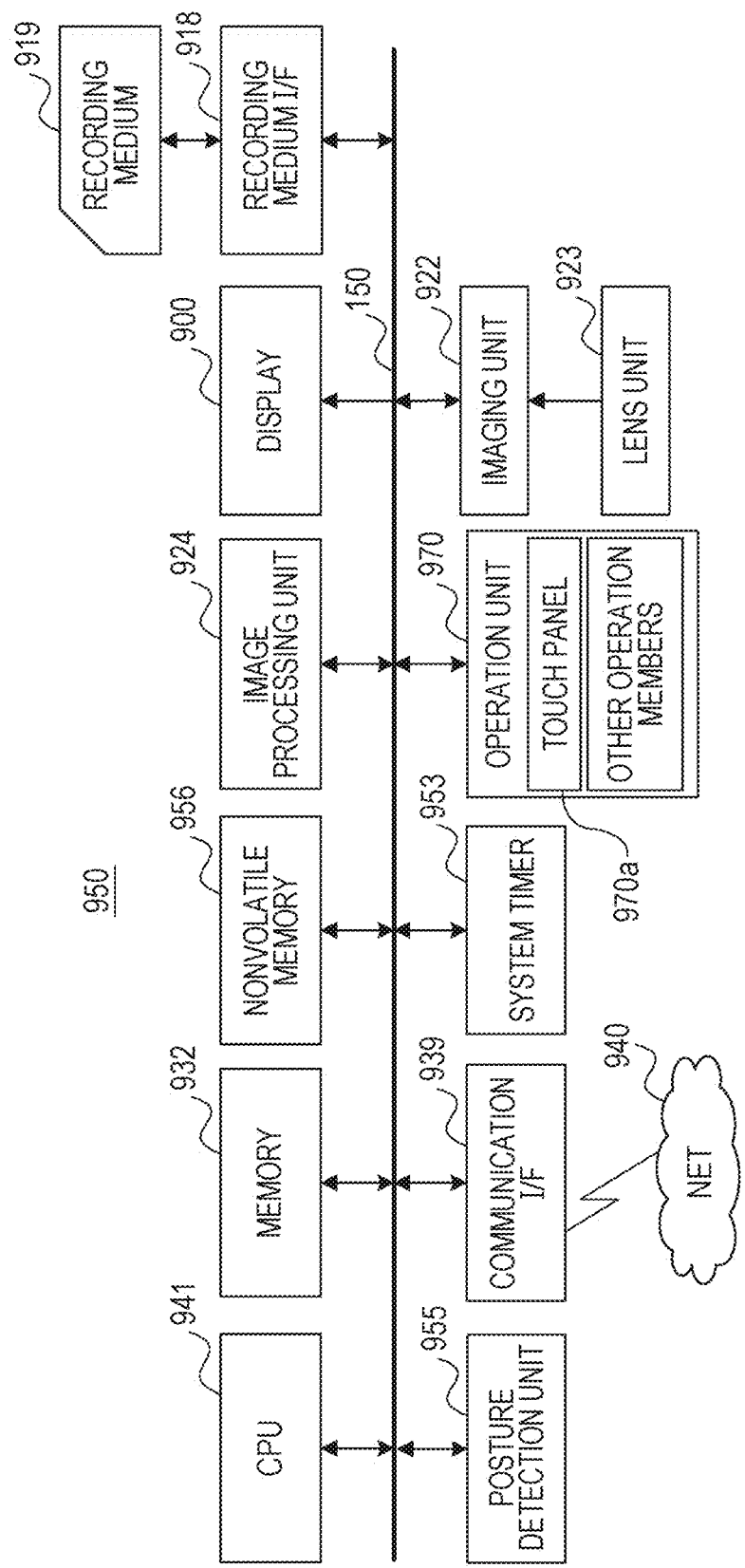
FIG. 9A is a diagram illustrating a modification in which a display control according to an embodiment is applied to a smartphone.

FIG. 9A is a block diagram showing an example of a configuration of a smartphone 950. A CPU 941, a memory 932, a nonvolatile memory 956, an image processing unit 924, a display 900, a recording medium I/F 918, a posture detection unit 955, a communication I/F 939, a system timer 953, an operation unit 970, and an imaging unit 922 are connected to an internal bus 150. Each unit connected to the internal bus 150 is capable of exchanging data with each other via the internal bus 150.

The memory 932 is, for example, a RAM (a volatile memory using semiconductor elements) or the like. The CPU 941 controls each part of the smartphone 950 according to a program stored, for example, in the nonvolatile memory 956 using the memory 932 as a work memory. The nonvolatile memory 956 stores image data, audio data, various programs for the CPU 941 to operate, and other data. The nonvolatile memory 956 is implemented, for example, using a hard disk (HD) or ROM.

Under the control of the CPU 941, the image processing unit 924 performs various operations on image data stored in the nonvolatile memory 956 or the recording medium 919, image data acquired via the communication I/F 939, captured images, and/of the like. The image processing performed by the image processing unit 924 includes A/D conversion processing, D/A conversion processing, image data encoding, compression, decoding, enlargement/reduction (resizing), noise reduction, and color conversion processing. The image processing unit 924 may be implemented using a dedicated circuit block for performing specific image processing. Depending on the type of image processing, the CPU 941 may perform image processing according to a program without using the image processing unit 924.

The display 900 displays an image, a GUI (Graphical User Interface) screen on which a GUI is displayed, and/or the like, under the control of the CPU 941. The CPU 941 generates a display control signal in accordance with a program and controls each part of the smartphone 950 to generate a video signal for display on the display 900 and outputs the generated video signal to the display 900. The display 900 displays an image based on the output video signal.

The operation unit 970 is an input device for accepting a user operation, including a character information input device such as a keyboard, a pointing device such as a mouse, a touch panel, or the like, a button, a dial, a joystick, a touch sensor, a touch pad, and/or the like. The touch panel is an input device configured to be overlaid on the display 900 in a planar form such that coordinate information is output according to a touched position.

The recording medium I/F 918 is configured such that a recording medium 919 such as a memory card, a CD, a DVD, or the like is allowed to be inserted in the recording medium I/F 918 to read or write data from or to the inserted recording medium 919 under the control of the CPU 941. The communication I/F 939 is an interface for communicating with an external device, the Internet 940, etc., to transmit/receive various data such as a file, a command, or the like. The system timer 953 is a timer that measures the time used for various controls and the time of a built-in clock.

The imaging unit 922 is a camera unit including an imaging device (an image sensor) implemented using a CCD device, a CMOS device or the like that converts an optical image into an electric signal. The imaging unit 922 includes a lens group (imaging lens) including a zoom lens and a focus lens, a shutter having an aperture function, an imaging device, an A/D converter configured to convert an analog signal output from the imaging device into a digital signal, and a barrier that covers the imaging system to prevent contamination and damage. The image processing unit 924 performs predetermined pixel interpolation, resizing processing such as reduction, color conversion processing, and/or the like on data acquired by the imaging unit 922. The CPU 941 performs exposure control, distance measurement control, and AWB (Auto White Balance) processing based on the calculation result obtained by the image processing unit 924. Display image data captured by the imaging unit 922 and image-processed by the image processing unit 924 is displayed on the display 900. The digital signal captured by the imaging unit 922, A/D-converted once by the A/D converter, and stored in the memory 102 is converted to an analog signal by the D/A converter and sequentially transmitted to the display 900 and displayed thereon as a live view image (referred to as a live view display). The live view can be displayed when the camera is in the standby mode for capturing a still image, in the standby mode for capturing a moving image, or when a moving image is being recorded, such that a captured subject image is displayed in substantially real time. The CPU 941 controls the imaging unit 922 and the image processing unit 924 to start an operation such as AF (Auto Focus) processing, AE (Automatic Exposure) processing, AWB processing, etc., in response to an image capture preparation instruction issued based on a user operation performed on the operation unit 970. In response to the image capture instruction, the CPU 941 performs control to start a series of image capture processing (actual image capture processing) including exposure processing, reading a signal from the imaging device, processing the captured image by the image processing unit 924 to generate an image file, and recording it in the recording medium 919.

The image capture instruction can be given by a user operation on the operation unit 970. The imaging unit 922 is capable of capturing a still image and a moving image.

The posture detection unit 955 detects the posture (orientation) of the smartphone 950 with respect to the direction of gravity. Based on the posture detected by the posture detection unit 955, it is possible to determine whether the image captured by the imaging unit 922 is an image captured by the smartphone 950 held horizontally or vertically. The CPU 941 can add orientation information corresponding to the posture detected by the posture detection unit 955 to an image file of the image captured by the imaging unit 922, or can rotate the image and record the resultant rotated image. An acceleration sensor, a gyro sensor, or the like may be used as the posture detection unit 955.

FIGS. 9B to 9E show examples of displays that appear on the display unit 900 when the smartphone 950 is in a particular orientation and the automatic switching to the power save mode is OFF.

Figure 9B:
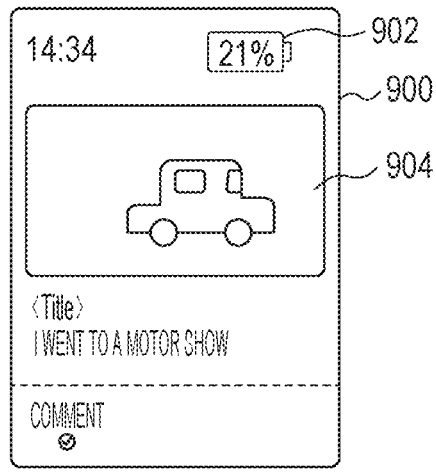
FIG. 9B is a diagram illustrating a modification in which a display control according to an embodiment is applied to a smartphone.
Figure 9C:
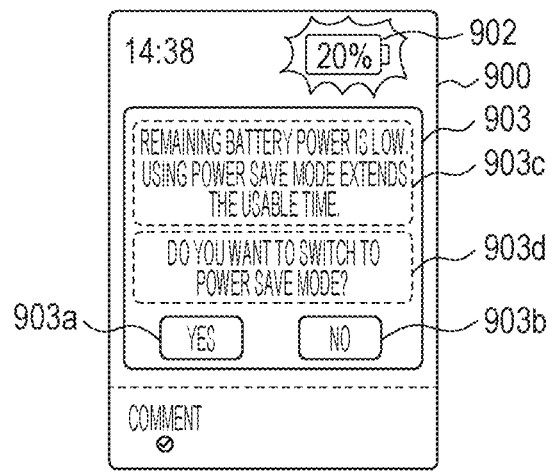
FIG. 9C is a diagram illustrating a modification in which a display control according to an embodiment is applied to a smartphone.
Figure 9D:
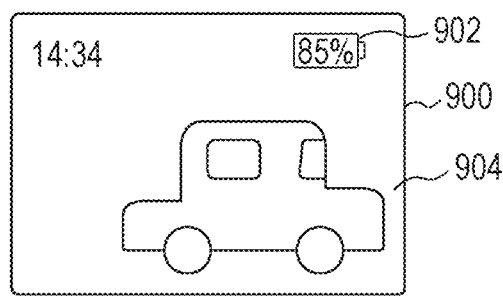
FIG. 9D is a diagram illustrating a modification in which a display control according to an embodiment is applied to a smartphone.
Figure 9E:
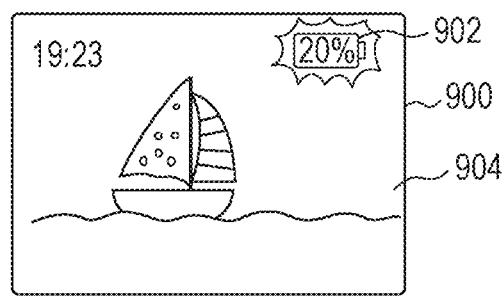
FIG. 9E is a diagram illustrating a modification in which a display control according to an embodiment is applied to a smartphone.
Figure 9F:
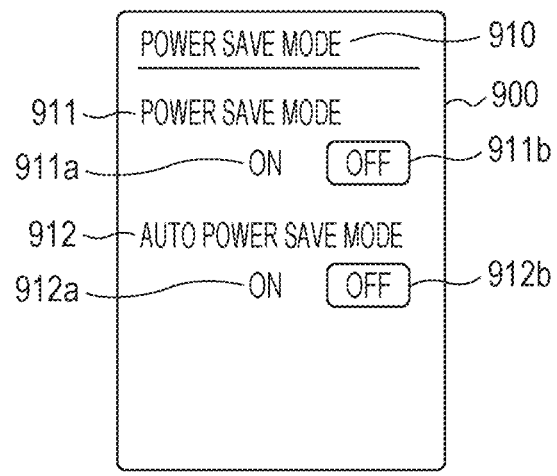
FIG. 9F is a diagram illustrating a modification in which a display control according to an embodiment is applied to a smartphone.

FIG. 9F shows a setting menu screen related to the power save mode for collectively changing various settings to settings that allow a reduction in power consumption when the remaining power of the battery of the smartphone 950 is low. When a selection item 911a of the setting item 911 is selected, the power mode is changed to the power save mode from the time of the selection (the settings of the smartphone 950 are collectively changed to settings that can reduce power consumption). When a selection item 911b is selected, the current settings are maintained without entering the power save mode. Note that when the selection item 911a is selected, the mode is changed to the power save mode from the time of the selection, regardless of the remaining battery power. A setting item 912 sets whether or not to automatically enter the power save mode when the remaining battery power of the smartphone 950 becomes equal to or less than a predetermined level (e.g., 20%). In a case where a selection item 912*a* is selected, when the remaining battery power becomes equal to or less than a certain level, the mode is automatically switched to the power save mode without giving any notification such as guidance display to the user. In a case where a selection item 912*b* is selected, when the battery power becomes equal to or less than a certain level, a notification such as guidance is displayed according to the orientation of the smartphone 950. In FIG. 9F, the power save mode is set to OFF and the automatic power save mode is set to OFF. When the power save mode is ON, the mode is switched to the power save mode regardless of the setting of the automatic power save mode (the power save mode and the automatic power save mode are exclusive). When the power save mode is OFF and the automatic power save mode is ON, the mode is automatically switched to the power save mode when the remaining battery power reaches a certain level.

FIG. 9B shows an example of a display that appears on the display unit 900 when the smartphone 950 is vertically oriented, the power save mode is OFF, and the remaining battery power is greater than 20%. A display 900, an icon 902 indicating the remaining battery power, and the time are displayed on the display unit 900. Because the power save mode is OFF and the remaining battery power is greater than 20% (21% in this example), the icon 902 is displayed in green as a normal display. An image 904 and information such as a title and a comment on the image 904 are displayed on the display 900.

FIG. 9C shows an example of a display that appears on the display unit 900 when the smartphone 950 is vertically oriented, the automatic power save mode is OFF, and the remaining battery power is equal to or less than 20%. In this example, since the remaining battery power is 20%, the icon 902 is displayed in color of red to indicate a warning that the remaining battery power is low. In the present embodiment, guidance 903 is displayed when the remaining battery power reaches 20%. The guidance 903 includes display of the effect of switching to the power save mode when the remaining battery power is low (guidance 903*c*), display prompting to set the power save mode (guidance 903*d*), setting items 903*a*, and 903*b* of the power save mode. If a selection item 903*a* is selected, the mode is switched to the power save mode (the power save mode is turned on). In a case where a selection item 903*b* is selected, the current settings are maintained without entering the power save mode. The icon 902 provides a simple warning indicating that the remaining battery power is equal to or less than a predetermined level, and guidance 903 prompts to enter the power save mode.

As shown in FIGS. 9B and 9C, the smartphone 950 is used vertically in most cases, and the user may use the smartphone without any particular intention. Therefore, it is more user-friendly to inform the user that the remaining battery power is low by displaying a large amount of information in a large display area, such as guidance 903. When the remaining battery power becomes equal to or less than 20%, if the user continues to use the smartphone 950 while maintaining the current settings and communication settings, the remaining battery power of the smartphone 950 will reach 0 (run out) in a short time and it will become impossible to use the smartphone 950. Since the smartphone can be used for a longer period of time by switching to the power save mode rather than continuing to use it with its current settings, guidance 903 and a selection item 903*a* are displayed to prompt to enter the power save mode. By enabling the setting contents of the power save mode to be changed by the selection items 903*a* and 903*b* without transitioning to the setting menu screen, the user can easily change the mode without feeling inconvenienced. When the mode is switched to the power save mode, the icon 902 is displayed in yellow to indicate that the mode is the power save mode. This indicates a state (mode) which is different from both the normal icon in FIG. 9B and the low battery power icon in FIG. 9E. The respective sentences of guidance 903*c* and 903*d* are surrounded by dotted lines, but this is for ease of explanation, and the dotted lines are not actually displayed together with the sentences.

FIG. 9D shows an example of a display that appears on the display unit 900 when the smartphone 950 is horizontally oriented, the power save mode is OFF, and the remaining battery power is greater than 20%. An image 904, an icon 902, and time are displayed on the display unit 900. Since the power save mode is OFF and the remaining battery power is more than 20% (85% in this example), the icon 902 is displayed in a normal view.

FIG. 9E shows an example of a display that appears on the display unit 900 when the smartphone 950 is horizontally oriented, the automatic power save mode is OFF, and the remaining battery power is equal to or less than 20%. In this case, since the remaining battery power is 19%, the icon 902 is displayed in color of red. When the smartphone 950 is used in the horizontal orientation, even if the remaining battery power becomes equal to or less than 20%, the display is not given in a large area such as that shown in guidance 903 in FIG. 9C, but instead, the icon 902 is displayed in the blinking manner or in a different color. Since the user grasps the smartphone 950 with both hands, the user is likely to be concentrating on a video image 904 or a website displayed on the display unit 900. By informing the user only with the icon 902 without displaying the guidance 903 such as that shown in FIG. 9C, it is possible to avoid reducing the visibility of the video image 904, thus preventing the user from being disturbed. Furthermore, both the low battery power and the video image 904 displayed on the display unit 900 can be viewed.

The display color of the icon 902 is changed to red in order to indicate that the remaining battery power has become equal to or less than a certain level (20%), but the notification method is not limited to this. The icon 902 may be blinked, or a frame may be displayed in the outermost part of the display area of the display unit 900 and blinked. The threshold value of the remaining battery power is set to 20%, but the threshold value is not limited to this. The user may be allowed to set the threshold value to an arbitrary value on the setting menu screen.

The technique described above can be applied to a situation other than the situation in which the video image 904 is viewed. For example, it can be applied to a situation in which a still or moving image is captured using a camera (the imaging unit 922) provided on the smartphone 950. More specifically, the user starts the camera while holding the smartphone 950 in the vertical orientation not always with the intention of trying to capture an image. Instead, the user may change settings related to capturing an image or may select an image capture mode (e.g., panorama mode, portrait mode, time-lapse mode, etc.). Under these circumstances, displaying an indication superimposed on the live view image to prompt to switch to a low power consumption mode is unlikely to bother the user or cause the user to miss a shutter release opportunity. On the other hand, when the camera is started while grasping the smartphone 950 in the horizontal orientation, the user is likely to be composing the image or waiting for an opportunity to press the shutter button. Under such circumstances, displaying a prompt to switch to a low power consumption mode is likely to cause the user to feel annoyed or miss a shutter release opportunity. For these reasons, when the smartphone 950 is in the vertical orientation, a display is given to prompt the user to make settings, but the display is not given when the smartphone 950 is in the horizontal orientation.

That is, when the smartphone is in a first orientation, the display is not given to prompt to set the functions related to the control of the smartphone, while when the smartphone is in a second orientation, the display is given to prompt to make settings of functions. This allows it to give the display so as to prompt to make settings at an appropriate timing depending on the orientation of the electronic device (the smartphone) without annoying the user.

The various controls assumed above to be performed by the system control unit 50 may be performed by a single piece of hardware, or may be performed by a plurality of pieces of hardware (for example, a plurality of processors or circuits) by sharing the processing to control the entire apparatus.

In the embodiment described above, the explanation has been given for the example in which the present invention is applied to a digital camera or a smartphone, but this is only by way of example and not limitation. For example, the present invention may also be applied to the following cases. The present invention is applicable to an electronic device if the electronic device allows it to make settings of functions related to the control of the electronic device and the electronic device can be used in various orientations of the housing of the electronic device. That is, the present invention is applicable to a tablet PC, a PDA, a portable telephone terminal, a portable image viewer, and the like. The preset invention is also applicable to a digital photo frame, a music player, a game machine, an e-book reader, a tablet terminal, a smartphone, a home appliance device with a display, an in-vehicle device, and the like.

OTHER EMBODIMENTS

The present invention can also be realized by executing processing described below. That is, software (program) for realizing one or more functions of the above-described embodiments is supplied to a system or apparatus via a network or various types of storage medium, and a program code is read and executed by a computer (a CPU, an MPU, or the like) of the system or the apparatus. In this case, the program and the storage medium storing the program constitute the present invention.

According to the present invention, it is possible to provide, at a proper timing, a display that prompts a user to set a function relating to control of an electronic device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus, comprising:
   line-of-sight detection unit configured to detect a line-of-sight input by a user;
   calibration unit configured to perform calibration on the line-of-sight input and set line-of-sight input calibration data;
   orientation detection unit configured to detect the orientation of the image capturing apparatus; and
   control unit configured to perform control such that in a case where the line-of-sight input calibration data is not set when the orientation detection unit detects that the image capturing apparatus is in a first orientation, a first display is displayed on a display to prompt to perform the calibration on the line-of-sight input, while in a case where the orientation detection unit detects that the image capturing apparatus is in a second orientation different from the first orientation, the first display is not displayed.

2. The image capturing apparatus according to claim 1, wherein the first display includes a display indicating an effect obtained by performing the calibration on the line-of-sight input.

3. The image capturing apparatus according to claim 1, wherein in a case where the image capturing apparatus is in the second orientation, the control unit performs control such that a second display is displayed to give a warning regarding the line-of-sight input calibration.

4. The image capturing apparatus according to claim 3, wherein the second display is an icon display.

5. The image capturing apparatus according to claim 3, wherein the first display has a larger display area than the second display has.

6. The image capturing apparatus according to claim 1, wherein the control unit performs control such that a live view image captured by an imaging unit of image capturing apparatus is displayed on the display, and the first display is displayed such that the first display is superimposed on the live view image.

7. The image capturing apparatus according to claim 1, further comprising
   a viewfinder, and
   an in-viewfinder display,
   wherein the control unit displays the first display on the in-viewfinder display.

8. The image capturing apparatus according to claim 1, wherein the first orientation is an orientation in which the image capturing apparatus is horizontal with respect to a direction of gravity and the second orientation is an orientation in which the image capturing apparatus is vertical with respect to the direction of gravity.

9. The image capturing apparatus according to claim 1, wherein in a case where a line-of-sight input function is set not to be used, the control unit performs control such that the first display is not performed even when the image capturing apparatus is in the first orientation.

10. The image capturing apparatus according to claim 1, wherein the calibration unit is capable of setting the line-of-sight input data for the first orientation and the second orientation of the image capturing apparatus, respectively.

11. The image capturing apparatus according to claim 10, wherein the control unit performs control such that in a case where the calibration is performed for one of the first orientation and the second orientation and the line-of-sight input calibration data is set, the first display is not displayed regardless of whether the image capturing apparatus is in the first orientation or the second orientation.

12. The image capturing apparatus according to claim 10, wherein the control unit performs control such that when the orientation detection unit detects that the image capturing apparatus is in the first orientation, although the line-of-sight input calibration data has been set, if the line-of-sight input calibration data does not include line-of-sight input calibration data for the first orientation, the first display is displayed.

13. The image capturing apparatus according to claim 1, further comprising a setting unit configured to set whether or not to use the line-of-sight input function,
wherein the control unit performs control such that in a case where the line-of-sight input function is set to be used by the setting unit, the first display is displayed according to the orientation of the image capturing apparatus.

14. The image capturing apparatus according to claim 1 wherein the first display includes a shortcut button for transitioning to a line-of-sight input calibration screen for performing the line-of-sight input calibration.

15. The image capturing apparatus according to claim 1, wherein the control unit performs control such that in a case where the line-of-sight input calibration data is not set, a second display indicating that the line-of-sight input calibration data is not set is displayed regardless of the orientation of the image capturing apparatus, and further the first display prompting to perform the calibration on the line-of-sight input is displayed depending on the orientation of the image capturing apparatus.

16. The image capturing apparatus according to claim 1, wherein
the calibration unit is capable of setting line-of-sight input calibration data for each of a plurality of classifications, and
the control unit performs control such that in a case where line-of-sight input calibration data is not set for a currently set classification among the plurality of classification, the first display is displayed depending on the orientation of the image capturing apparatus.

17. A non-transitory computer-readable storage medium storing a program for causing a computer to function as each means of the image capturing apparatus according to claim 1.

18. A method of controlling an image capturing apparatus supporting a line-of-sight input function, comprising:
performing calibration on the line-of-sight input and setting line-of-sight input calibration data;
detecting the orientation of the image capturing apparatus; and
performing control such that in a case where the line-of-sight input calibration data is not set when the image capturing apparatus is detected to be in a first orientation, a first display is displayed on a display to prompt to perform the calibration on the line-of-sight input, while in a case where the image capturing apparatus is detected to be in a second orientation different from the first orientation, the first display is not displayed.

* * * * *